US011997488B2

(12) United States Patent
Yoon et al.

(10) Patent No.: US 11,997,488 B2
(45) Date of Patent: *May 28, 2024

(54) METHOD AND APPARATUS FOR MANAGING AND VERIFYING CERTIFICATE

(71) Applicant: Samsung Electronics Co., Ltd., Suwon-si (KR)

(72) Inventors: Kangjin Yoon, Suwon-si (KR); Jonghoe Koo, Suwon-si (KR); Duckey Lee, Suwon-si (KR); Taehyung Lim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 9 days.

This patent is subject to a terminal disclaimer.

(21) Appl. No.: 18/164,821

(22) Filed: Feb. 6, 2023

(65) Prior Publication Data

US 2023/0188990 A1  Jun. 15, 2023

Related U.S. Application Data

(63) Continuation of application No. 17/521,287, filed on Nov. 8, 2021, now Pat. No. 11,576,044, which is a (Continued)

(30) Foreign Application Priority Data

May 9, 2019  (KR) .................. 10-2019-0054522
Jul. 3, 2019  (KR) .................. 10-2019-0080318

(51) Int. Cl.
*H04W 12/069* (2021.01)
*G06F 8/61* (2018.01)
(Continued)

(52) U.S. Cl.
CPC ............ *H04W 12/069* (2021.01); *G06F 8/61* (2013.01); *G06Q 20/127* (2013.01);
(Continued)

(58) Field of Classification Search
CPC ........... H04W 12/069; H04W 12/0431; H04W 8/245; G06F 8/61; G06Q 20/127;
(Continued)

(56) References Cited

U.S. PATENT DOCUMENTS 7,350,074 B2  3/2008 Gupta et al.
9,038,162 B2  5/2015 Hagiu et al.
(Continued)

FOREIGN PATENT DOCUMENTS

CN  101001144 A  7/2007
CN  101171782 A  4/2008
(Continued)

OTHER PUBLICATIONS

Klaus Vedder, "Smart Secure Platform", In: ETSI Security Week 2018, Jun. 13, 2018 [retrieved on Jul. 27, 2020].
(Continued)

*Primary Examiner* — Ernest G Tacsik
(74) *Attorney, Agent, or Firm* — Jefferson IP Law, LLP

(57) ABSTRACT

A method of managing and verifying a certificate of a terminal is provided. The method includes obtaining certificate information that is usable when downloading and installing a specific bundle corresponding to at least one of a secondary platform bundle family identifier or a secondary platform bundle family custodian identifier, transmitting, to a secondary platform bundle manager, the certificate information corresponding to the at least one of the secondary platform bundle family identifier or the secondary platform bundle family custodian identifier of the specific bundle, and receiving, from the secondary platform bundle manager, at (Continued)

least one of a certificate of the secondary platform bundle manager, certificate information to be used by a smart secure platform (SSP), the secondary platform bundle family identifier, or the secondary platform bundle family custodian identifier.

16 Claims, 15 Drawing Sheets

Related U.S. Application Data continuation of application No. 16/871,278, filed on May 11, 2020, now Pat. No. 11,172,362.

(51) Int. Cl.
*G06Q 20/12* (2012.01)
*G06Q 30/018* (2023.01)
*H04L 9/08* (2006.01)
*H04L 9/32* (2006.01)
*H04W 8/24* (2009.01)
*H04W 12/0431* (2021.01)

(52) U.S. Cl.
CPC ....... *G06Q 30/0185* (2013.01); *H04L 9/0844* (2013.01); *H04L 9/3247* (2013.01); *H04W 8/245* (2013.01); *H04W 12/0431* (2021.01); *H04L 2209/80* (2013.01)

(58) Field of Classification Search
CPC . G06Q 30/0185; H04L 9/0844; H04L 9/3247; H04L 2209/80
See application file for complete search history.

(56) References Cited

U.S. PATENT DOCUMENTS 9,705,546 B2 7/2017 Lee et al.
10,469,462 B2 11/2019 Kim et al.
2012/0260095 A1 10/2012 Von Hauck et al.
2012/0297473 A1* 11/2012 Case ................. H04W 4/70 726/10
2017/0006473 A1 1/2017 Hauck et al.
2017/0064552 A1* 3/2017 Park ................ H04L 63/0869
2017/0118105 A1 4/2017 Saltsidis
2017/0222991 A1 8/2017 Yang
2018/0091314 A1* 3/2018 Li ........................ H04L 9/30

FOREIGN PATENT DOCUMENTS

CN          101263468 A      9/2008
CN          103634788 A      3/2014
CN          104429022 A      3/2015
KR     10-2016-0010239 A     1/2016
KR     10-2017-0124360 A    11/2017

OTHER PUBLICATIONS

MSG MCP, "Approved minutes 12th meeting ad hoc multistakeholder group on Mobile Contactless SEPA Cards Interoperability Implementation Guidelines (MCP IIGs)", In: MSG MCP 008-2018, V1.0, Feb. 23, 2018.

International Search Report dated Aug. 11, 2020, issued in International Patent Application No. PCT/KR2020/006156.

Anonymous, Smart Cards; Smart Secure Platform (SSP); Requirements Specification, ETSI TS 103 465 V15.0.0, Apr. 23, 2019, pp. 1-50, XP051721330, Sophia-Antipolis, France Retrieved from the Internet: URL:http://www.3gpp.org/flp/tsg%5Fsa/WG3%5FSecurity/TSGS3%5F95%5FReno/Docs/S3%2D191158%2Ezip section 9.2. 11.5; pp. 12-14.

5 European Search Report dated Feb. 4, 2022, issued in European Application No. 20801562.8.

Indian Office Action dated Feb. 13, 2023, issued in Indian Application No. 202137038203.

European Office Action dated Nov. 28, 2023, issued in European Application No. 20801562.8.

Chinese Notice of Allowance dated Jan. 10, 2024, issued in Chinese Application No. 202080033823.8.

* cited by examiner

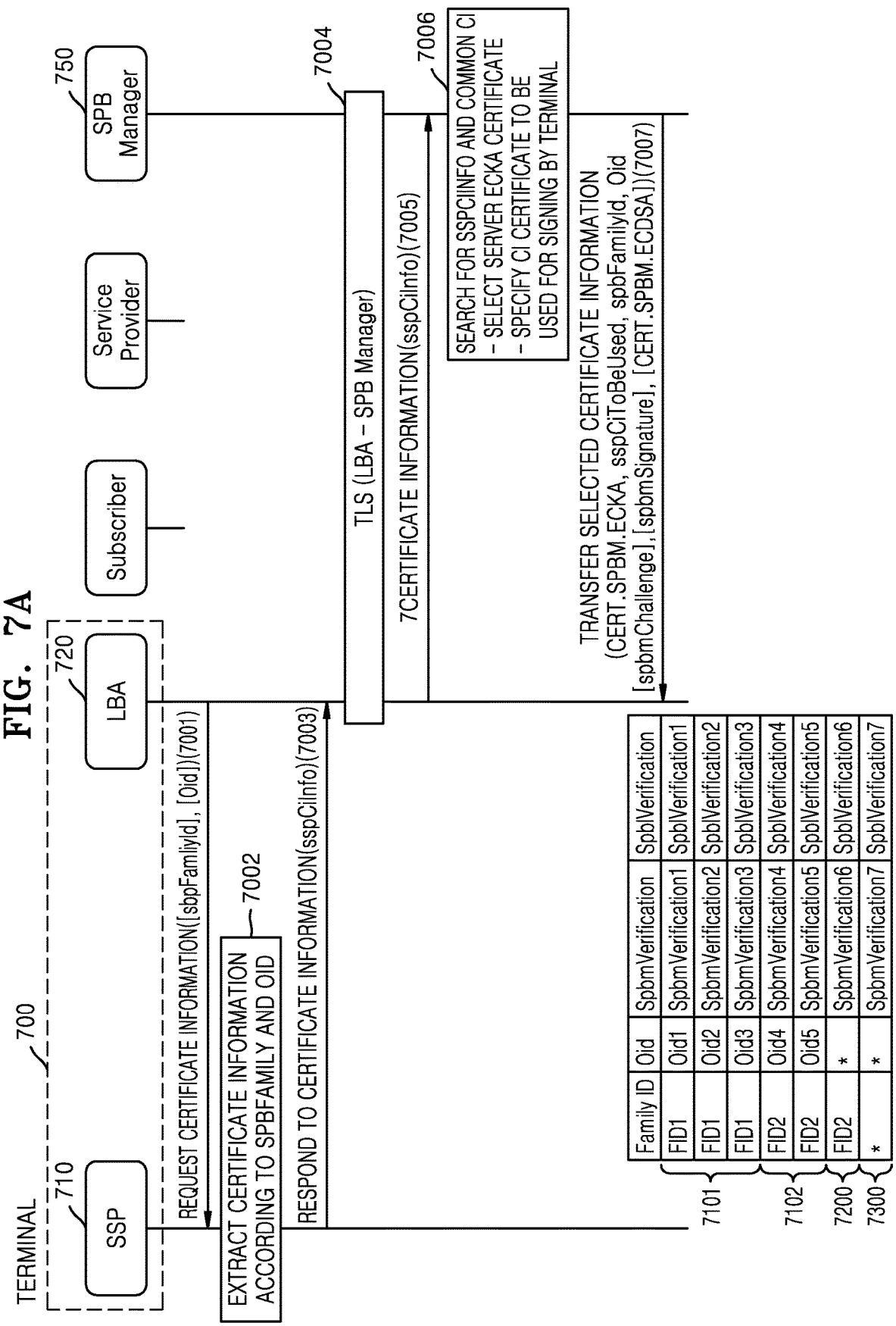

METHOD AND APPARATUS FOR MANAGING AND VERIFYING CERTIFICATE

CROSS-REFERENCE TO RELATED APPLICATION(S)

This application is a continuation application of prior application Ser. No. 17/521,287, filed on Nov. 8, 2021, which issued as U.S. Pat. No. 11,576,044 on Feb. 7, 2023, which is a continuation application of prior application Ser. No. 16/871,278, filed on May 11, 2020, which issued as U.S. Pat. No. 11,172,362 on Nov. 9, 2021, which is based on and claims priority under 35 U.S.C. § 119(a) of a Korean patent application number 10-2019-0054522, filed on May 9, 2019, in the Korean Intellectual Property Office, and of a Korean patent application number 10-2019-0080318, filed on Jul. 3, 2019, in the Korean Intellectual Property Office, the disclosure of each of which is incorporated by reference herein in its entirety.

BACKGROUND

1. Field

The disclosure relates to a method and apparatus for managing and verifying a certificate. More particularly, the disclosure relates to a method and apparatus for selecting a valid certificate and certificate issuer information that may be used when a bundle is downloaded and installed between a terminal and a server, and verifying the validity of the selected certificate.

2. Description of Related Art

To meet the increase in demand for wireless data traffic after the commercialization of 4th generation (4G) communication systems, considerable efforts have been made to develop pre-5$^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data rate, 5G communication systems are being developed to be implemented in a super-high-frequency band (millimeter wave (mmWave)), e.g., a band of 60 GHz. To reduce path loss of radio waves and increase a propagation distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. In order to improve system networks for 5G communication systems, various technologies have been developed, e.g., evolved small cells, advanced small cells, cloud radio access networks (Cloud-RAN), ultra-dense networks, Device-to-Device communication (D2D), wireless backhaul, moving networks, cooperative communication, Coordinated Multi-Points (CoMP), and interference cancellation. In addition, for 5G communication systems, other technologies have been developed, e.g., hybrid frequency-shift keying (FSK) and quadrature amplitude modulation (QAM) (FQAM) and Sliding Window Superposition Coding (SWSC), which are Advanced Coding Modulation (ACM) schemes, and Filter Bank Multi Carrier (FBMC), non-orthogonal multiple access (NOMA) and sparse code multiple access (SCMA), which are advanced access schemes.

The Internet has evolved from a human-based connection network, where humans create and consume information, to the Internet of Things (IoT), where distributed elements, such as objects, exchange information with each other to process the information. Internet of Everything (IoE) technology is emerging, in which technology related to the IoT is combined with, for example, technology for processing big data through connection with a cloud server. In order to implement the IoT, various technological elements are required, such as sensing technology, wired/wireless communication and network infrastructures, service interface technology, security technology, etc. In recent years, technologies including a sensor network for connecting objects, Machine to Machine (M2M) communication, Machine Type Communication (MTC), etc. have been studied. In the IoT environment, intelligent Internet Technology (IT) services may be provided to collect and analyze data obtained from connected objects to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high-quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

As various services may be provided according to the foregoing and the development of wireless communication systems, methods for efficiently providing such services are required. More specifically, there is a demand for methods and apparatuses for selecting valid certificates and certificate issuer information that may be used when a bundle is downloaded and installed between a terminal and a server, and verifying the validity of the selected certificates.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for remotely installing a control module in a security module installed in an electronic device and providing a security service through the control module and security information stored in the security module.

Another aspect of the disclosure is to provide an apparatus and method for selecting and verifying a certificate to be used for downloading a bundle classified by a secondary platform bundle family identifier, or a secondary platform bundle family identifier and a secondary platform bundle family custodian identifier, which are all different from one another, between a terminal and a secondary platform bundle manager.

Additional aspects will be set forth in part in the description which follows and, in part, will be apparent from the description, or may be learned by practice of the presented embodiments.

In accordance with an aspect of the disclosure, a method of a smart secure platform (SSP) in a terminal verifying certificate in a wireless communication system is provided. The method includes receiving, a local from bundle assistant (LBA), a request for a SSP credential including secondary platform bundle family identifier (SPB Family ID), secondary platform bundle family custodian object identifier (SPB Family Custodian Object ID) and a secondary platform bundle manager (SPBM) certificate for key agreement, verifying the SPBM certificate for key agreement based on the SPB Family ID and the SPB Family Custodian Object ID, generating the SSP credential, and transmitting, to the LBA, the generated SSP credential.

The method may further include receiving, from the LBA, a SPBM credential including a SPBM certificate for digital signature, and verifying the SPBM certificate for digital signature based on the SPB Family ID and the SPB Family Custodian Object ID.

The method may further include installing a bundle related to the SPB Family ID and the SPB Family Custodian Object ID.

The SPB Family ID and the SPB Family Custodian Object ID may be included in the extension configuration of the SPBM certificate for key agreement.

The method may further include determining the SPBM certificate for key agreement as invalid, when the verification of the SPBM certificate for key agreement fails.

The SPB Family ID and the SPB Family Custodian Object ID may be further included in the extension configuration of the SPBM certificate for digital signature.

The method may further include determining the SPBM certificate for digital signature as invalid, when the verification of the SPBM certificate for digital signature fails.

The method may further include receiving, from the LBA, a request for certificate information configured in the SSP including at least one of a SPB Family ID or a SPB Family Custodian Object ID, generating SSP certification information based on the SPB Family ID and the SPB Family Custodian Object ID included in the request for certificate information configured in the SSP, and transmitting, to the LBA, the generated SSP certification information.

The SSP certification information may include general certificate information, bundle family certificate information, bundle family custodian certificate information, first certificate information for the SSP to verify the SPBM and second certificate information for the SPBM to verify the SSP.

In accordance with another aspect of the disclosure, a smart secure platform (SSP) in a terminal verifying certificate in a wireless communication system is provided. The SSP includes a transceiver, and at least one processor coupled with the transceiver. The at least one processor is configured to receive, from a local bundle assistant (LBA), a request for a SSP credential including secondary platform bundle family identifier (SPB Family ID), secondary platform bundle family custodian object identifier (SPB Family Custodian Object ID) and a secondary platform bundle manager (SPBM) certificate for key agreement, verify the SPBM certificate for key agreement based on the SPB Family ID and the SPB Family Custodian Object ID, generate the SSP credential, and transmit, to the LBA, the generated SSP credential.

The at least one processor may be further configured to receive, from the LBA, a SPBM credential including a SPBM certificate for digital signature, and verify the SPBM certificate for digital signature based on the SPB Family ID and the SPB Family Custodian Object ID.

The at least one processor may be further configured to install a bundle related to the SPB Family ID and the SPB Family Custodian Object ID.

The at least one processor may be further configured to determine the SPBM certificate for key agreement as invalid, when the verification of the SPBM certificate for key agreement fails.

The at least one processor may be further configured to determine the SPBM certificate for digital signature as invalid, when the verification of the SPBM certificate for digital signature fails.

The at least one processor may be further configured to receive, from the LBA, a request for certificate information configured in the SSP including at least one of a SPB Family ID or a SPB Family Custodian Object ID, generate SSP certification information based on the SPB Family ID and the SPB Family Custodian Object ID included in the request for certificate information configured in the SSP, and transmit, to the LBA, the generated SSP certification information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7A is a diagram illustrating an example of a certificate negotiating procedure for selecting a certificate that may be used for mutual authentication and encryption between a terminal and a secondary platform bundle manager, according to an embodiment of the disclosure;

Throughout the drawings, it should be noted that like reference numbers are used to depict the same or similar elements, features, and structures.

DETAILED DESCRIPTION

Figure 1:
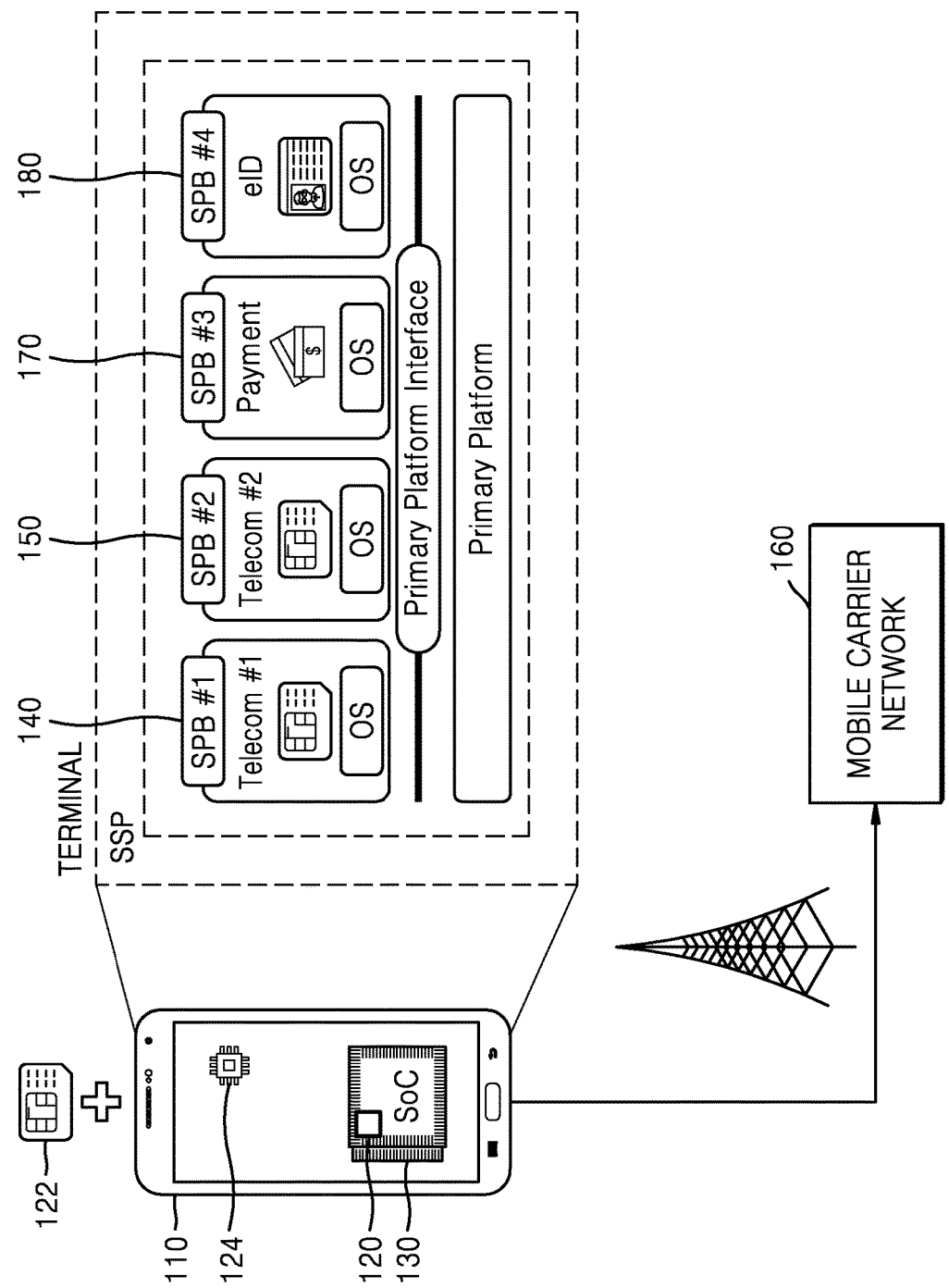
FIG. 1 is a diagram illustrating a mobile communication network connection method performed by a terminal using a smart secure platform (SSP) equipped with a telecom bundle having a profile, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, descriptions of technical contents that are well known in the technical field to which the disclosure belongs and are not directly related to the disclosure will be omitted. By omitting the unnecessary description, the gist of the disclosure may be more clearly conveyed without obscuring the subject matter.

For the same reasons, elements may be exaggerated, omitted, or schematically illustrated in drawings for clarity. In addition, the size of each element does not completely reflect the actual size. In the drawings, like reference numerals denote like elements.

Advantages and features of the disclosure and methods of accomplishing the same may be understood more readily by reference to the following detailed description of the embodiments and the accompanying drawings. In this regard, the embodiments of the disclosure may have different forms and should not be construed as being limited to the descriptions set forth herein. Rather, these embodiments are provided such that the disclosure will be thorough and complete and will fully convey the concept of the disclosure to one of ordinary skill in the art, and the disclosure will only be defined by the appended claims. Throughout the specification, like reference numerals denote like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software element or hardware element such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to elements such as software elements, object-oriented software elements, class elements, and task elements, and may include processes, functions, attributes, procedures, subroutines, segments of program code, drivers, firmware, micro codes, circuits, data, a database, data structures, tables, arrays, or variables. A function provided by the elements and "units" may be associated with the smaller number of elements and "units", or may be divided into additional elements and "units". Furthermore, the elements and "units" may be embodied to reproduce one or more central processing units (CPUs) in a device or security multimedia card.

Specific terms used in the following description are provided to help understanding the disclosure, and use of the specific terms may be changed to other forms without departing from the technical spirit of the disclosure.

A Secure Element (SE) refers to a security module configured as a single chip capable of storing security information (e.g., a mobile communication network access key, user identification information such as an identification card/passport or the like, credit card information, an encryption key, etc.), and mounting and operating a control module (e.g., a network access control module such as a Universal Subscriber Identity Module (USIM) or the like, an encryption module, a key generation module, etc.) using the stored security information. The SE may be used in various electronic devices (e.g., smartphones, tablets, wearable devices, vehicles, IoT devices, etc.), and may provide a security service (e.g., access to a mobile communication network, payment, user authentication, etc.) through the security information and the control module.

The SE may be classified into a Universal Integrated Circuit Card (UICC), an embedded Secure Element (eSE), and a smart secure platform (SSP) in which the UICC and the eSE are integrated, and may be subdivided into a removable form, an embedded form, and an integrated form that is integrated into a specific device or a System on Chip (SoC) according to a form of being connected to or installed in an electronic device.

The UICC is a smart card inserted into a mobile communication terminal and used, and is also referred to as a UICC. The UICC may include an access control module for accessing a network of a mobile carrier service provider. Examples of the access control module include a USIM, a Subscriber Identity Module (SIM), an IP Multimedia Service Identity Module (ISIM), etc. In addition, a UICC including a USIM is generally referred to as a general USIM card. Likewise, a UICC including a SIM is generally referred to as a SIM card. The SIM may be mounted in a UICC manufacturing process. Alternatively, a SIM of a mobile communication service to be used at a user's desired time point may be downloaded to the UICC card. In addition, the UICC may download and install a plurality of SIMs, and select and use at least one of the SIMS. The UICC card may or may not be fixed to a terminal. A UICC that is fixed to a terminal and used may be referred to as an embedded UICC (eUICC), and in particular, a UICC embedded in a SoC including a communication processor of a terminal, an application processor, or a single processor structure in which these two processors are integrated may also be referred to as an integrated UICC (iUICC). In general, the eUICC and the iUICC may refer to a UICC which is fixed to a terminal and used and is capable of remotely downloading and selecting a SIM module. In the disclosure, a UICC capable of remotely downloading and selecting a SIM module is referred to as an eUICC or an iUICC. That is, a UICC which is not fixed or fixed to a terminal among UICCs capable of remotely downloading and selecting a SIM module is collectively referred to as an eUICC or an iUICC. In addition, downloaded SIM module information is collectively referred to as an eUICC profile, an iUICC profile, or more simply, a profile.

The eSE refers to a fixed SE that is fixed to an electronic device and used. The eSE is generally manufactured only for manufacturers at a request of terminal manufacturers, and may be manufactured including an operating system and a framework. The eSE may remotely download and install an applet-type service control module, and may be used for various security services such as electronic wallet, ticketing, electronic passport, digital key, etc. In the disclosure, a single chip-type SE attached to an electronic device, capable of remotely downloading and installing a service control module, is collectively called an eSE.

The SSP may be classified into a removable SSP (rSSP), an embedded SSP (eSSP), and an integrated SSP (iSSP) embedded in a SoC. The SSP may include one primary platform (PP) and at least one secondary platform bundle (SPB) operating on the PP, the PP may include at least one of a hardware platform or a low-level operating system (LLOS), and the SPB may include at least one of a high-level operating system (HLOS) or an application driven on the HLOS. The SPB is also called a bundle. The bundle may access resources such as a central processing unit of a PP, a memory, etc. through a primary platform interface (PPI) provided by the PP, and thus may be driven on the PP. A communication application such as a SIM, a USIM, an ISIM, etc. may be loaded on a bundle, and various applications such as electronic wallet, ticketing, electronic passport, and digital key may be loaded on the bundle.

The SSP may be used for the UICC or eSE described above according to a bundle downloaded and installed remotely, and the UICC and eSE may be used for combined application by installing a plurality of bundles in a single SSP and simultaneously operating the bundles. That is, when a bundle including a profile is operated in the SSP, the SSP may be used for the UICC for accessing a network of a mobile carrier. A corresponding UICC bundle may be operated by remotely downloading at least one profile, such as an eUICC or an iUICC, into the bundle and selecting a profile. Further, when a bundle including a service control module equipped with an application capable of providing services such as electronic wallet, ticketing, the electronic passport, or digital key on the SSP is operated in the SSP, the SSP may be used for the eSE. A plurality of service control modules may be integrated into one bundle and operated, or may each be installed in an independent bundle and operated.

Hereinafter, the terms used in the disclosure will be described in more detail.

In the disclosure, the SSP is a chip-type security module that may be classified into an rSSP, an eSSP, and an iSSP embedded in a SoC, wherein functions of the UICC and the eSE may be integrally supported in a single chip. The SSP may download and install a bundle from an external secondary platform bundle manager (SPB manager) by using an Over the Air (OTA) technique.

In the disclosure, a method of downloading and installing a bundle in an SSP by using an OTA technique may be applied in the same manner to a removable SSP (rSSP) capable of being inserted into and detached from a terminal, a fixed SSP (eSSP) installed in a terminal, and an integrated SSP (iSSP) included in a SoC installed in a terminal.

In the disclosure, the term "UICC" may be used interchangeably with SIM, and the term "eUICC" may be used interchangeably with eSIM.

In the disclosure, an SPB is driven on a PP of an SSP by using a resource of the PP, and for example, a UICC bundle may mean that an application, a file system, an authentication key value, etc. stored in an existing UICC, and a HLOS in which the application, the file system, the authentication key value, etc. are operated are packaged in a software form.

In the disclosure, a USIM Profile may mean the same as a profile or may mean that information included in a USIM application in the profile is packaged in a software form.

In the disclosure, an operation of enabling a bundle by a terminal or an external server may mean an operation of changing a state of the profile to an enabled state and configuring the terminal to be able to receive a service (e.g., a communication service through a mobile operator, a credit card payment service, a user authentication service, etc.) provided by the bundle. The bundle in the enabled state may be represented as an enabled bundle. The enabled bundle may be stored in an encrypted state in an internal or external storage space of the SSP.

In the disclosure, the enabled bundle may be changed to an active state according to an input (e.g., a user input, a push, a request from an application in a terminal, an authentication request from a communication provider, a PP management message, etc.) from outside the bundle or an operation (e.g., a timer, polling, etc.) inside the bundle. A bundle in the active state may be loaded into a driving memory in the SSP from the internal or external storage space of the SSP, and may process security information by using a Secure CPU inside the SSP and provide a security service to the terminal.

In the disclosure, an operation of disabling the bundle by the terminal or the external server may mean an operation of changing the state of the bundle to a disabled state and configuring the terminal to be unable to receive the service provided by the bundle. The profile in the disabled state may be represented as a disabled bundle. The enabled bundle may be stored in an encrypted state in the internal or external storage space of the SSP.

In the disclosure, an operation of deleting the bundle by the terminal or the external server may mean an operation of changing the state of the bundle to a deleted state and configuring the terminal or the external server to be no longer able to enable or disable the bundle. A bundle in the deleted state may be represented as a deleted bundle.

In the disclosure, the secondary platform bundle manager may provide a function of generating a bundle at a request of a service provider or another secondary platform bundle manager, encrypting the generated bundle, generating a bundle remote management instruction, or encrypting the generated bundle remote management instruction. The secondary platform bundle manager providing the function described above may be represented as at least one of an SPB manager, a remote bundle manager (RBM), an image delivery server (IDS), a subscription manager data preparation (SM-DP), a subscription manager data preparation plus (SM-DP+), a manager bundle server, a managing SM-DP+, a bundle encryption server, a bundle generation server, a bundle provisioner (BP), a bundle provider, or a bundle provisioning credentials holder (BPC holder).

In the disclosure, the secondary platform bundle manager may function to manage configurations of a key and a certificate for downloading, installing, or updating a bundle in the SSP and remotely managing a state of the bundle. The secondary platform bundle manager providing the function described above may be represented as at least one of an SPBM, an RBM, an IDS, a subscription manager secure routing (SM-SR), an SM-SR+, an off-card entity of an eUICC profile manager or a PMC holder, or an eUICC manager (EM).

In the disclosure, an opening relay server may be represented as at least one of an SPBM, an RBM, a secondary platform bundle discovery server (SPBDS), a bundle discovery server (BDS), a subscription manager discovery service (SM-DS), a discovery service (DS), a root SM-DS, or an alternative SM-DS. The opening relay server may receive an event register request (or a register event request) from at least one secondary platform bundle manager or opening relay server. In addition, at least one opening relay server may be used in combination, and in this case, a first opening relay server may receive a register event request from a second opening relay server as well as the secondary platform bundle manager. In the disclosure, a function of the opening relay server may be integrated into the secondary platform bundle manager.

In the disclosure, the secondary platform bundle manager may refer to a combination of a function of generating and encrypting a bundle or a bundle remote management instruction and a function of configuring an SSP and managing an installed bundle. In addition, the secondary platform bundle manager may refer to the combination of the functions of the opening relay server. Therefore, in one or more embodiments of the disclosure hereinafter, operations of the secondary platform bundle manager and the opening relay server may be performed in one secondary platform bundle manager. In addition, each function may be performed by a plurality of secondary platform bundle managers that are separated from each other. In addition, in the specification of the disclosure, the secondary platform bundle manager or the opening relay server may be represented as a bundle server. The bundle server may be one of the secondary platform bundle manager and the opening relay server, or may be a device including both the secondary platform bundle manager and the opening relay server.

In the disclosure, the secondary platform bundle manager and the opening relay server may be referred to as an SPBM or an RBM. In addition, the bundle server may be referred to as a secondary platform bundle manager.

The term "terminal" used in the disclosure may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. One or more embodiments of the terminal may include a cellular phone, a smartphone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storage and playback home appliance having a wireless communication function, an Internet home appliance with wireless Internet access and browsing functions, and a portable unit or terminals integrating combinations of such functions. In addition, the terminal may include a Machine to Machine (M2M) terminal and a Machine Type Communication (MTC) terminal/device, but is not limited thereto. In the disclosure, the terminal may be referred to as an electronic device.

In the disclosure, the electronic device may include an SSP capable of downloading and installing a bundle. When the SSP is not embedded in the electronic device, the SSP physically separated from the electronic device may be inserted into the electronic device and connected to the electronic device. For example, the SSP may be inserted into the electronic device in a card form. The electronic device may include a terminal, and in this case, the terminal may be a terminal including an SSP capable of downloading and installing a bundle. The SSP may be embedded in the terminal, and when the terminal and the SSP are separated from each other, the SSP may be inserted into the terminal, or may be inserted into the terminal and connected to the terminal In the disclosure, the terminal or the electronic device may include software or an application installed in the terminal or the electronic device to control the SSP. The software or application may be referred to as, for example, a local bundle assistant (LBA) or a local bundle manager (LBM).

In the disclosure, a bundle classifier may be referred to as a factor matching a secondary platform bundle identifier (SPB ID), a secondary platform bundle family identifier (SPB Family ID), a secondary platform bundle family custodian identifier (SPB Family Custodian Object ID), a bundle matching ID, and an event identifier (Event ID). The SPB ID may represent a unique identifier of each bundle. The SPB Family ID may represent an identifier that identifies a type of a bundle (e.g., a telecom bundle for mobile carrier network access). In the disclosure, the SPB Family ID may be referred to as spbFamilyId. The SPB Family Custodian Object ID may represent an identifier that identifies a subject (e.g., a mobile operator, a terminal manufacturer, a specific organization, etc.) which manages the SPB Family ID. In the disclosure, the SPB Family Custodian Object ID may be referred to as an object identifier (OID). The bundle classifier may be used as a value capable of indexing a bundle in the secondary platform bundle manager. In the disclosure, an SSP identifier (SSP ID) may be a unique identifier of the SSP embedded in the terminal and may be referred to as sspID. In addition, as in the embodiments of the disclosure, the SSP ID may be a terminal ID when the terminal and an SSP chip are not separated. In addition, the SSP ID may be referred to as a specific SPB ID in the SSP. In more detail, the SSP ID may be referred to as an SPB ID of a secondary platform bundle loader (SPBL) that installs other bundles in the SSP and manages enablement, disablement, and deletion of the other bundles. The SSP may have a plurality of SSP IDs, and the SSP IDs may be values derived from a unique single SSP ID.

In the disclosure, the SPBL may refer to a management bundle that installs other bundles in the SSP and manages enablement, disablement and deletion of the other bundles. An LBA or a remote server of the terminal may install, enable, disable, or delete a specific bundle through the SPBL. In the disclosure, the SPBL may be referred to as an SSP.

In the disclosure, bundle provisioning credentials (BPC) may be used for mutual authentication between the secondary platform bundle manager and the SSP, bundle encryption, and signature. The BPC may include at least one of a symmetric key, a Rivest Shamir Adleman (RSA) certificate and a private key, an Elliptic Curved Cryptography (ECC) certificate and a private key, a root certification authority (CA), or a certificate chain. When there are a plurality of secondary platform bundle managers, different BPCs may be stored in the SSP or used for each of the secondary platform bundle managers.

In the disclosure, profile management credentials (PMC) may be used for mutual authentication between a profile management server and an eUICC, data encryption, and signature. The PMC may include at least one of a symmetric key, an RSA certificate and a private key, an ECC certificate and a private key, a Root CA, or a certificate chain. In addition, when there are a plurality of profile management servers, different PMCs may be stored in the eUICC or used for each of the profile management servers.

In the disclosure, the term "event" may be collectively referred to as bundle download, remote bundle management, management/processing instructions of other bundles or SSPs. The event may be referred to as a remote bundle provisioning operation (RBP operation) or an event record, and each event may be referred to as an event identifier (Event ID or EventID), a matching identifier (Matching ID or MatchingID), an address (FQDN, IP address, or uniform resource locator (URL)) of the secondary platform bundle manager or the opening relay server in which each event is stored, or data including at least one server identifier. The bundle download may be used together with bundle installation. In addition, the term "event type" may be used to represent whether a specific event is bundle download or remote bundle management (for example, deletion, enablement, disablement, replacement, update, etc.) or an instruction for processing/managing other bundles or SSPs, and may be referred to as an operation type (or OperationType), an operation class (or OperationClass), an event request type, an event class, an event request class, etc.

In the disclosure, the term "bundle image" or "image" may be used to represent a data object of a specific bundle or may be referred to as a bundle TLV or a bundle image TLV. When the bundle image is encrypted by using an encryption parameter, the bundle image may be referred to as a protected bundle image (PBI) or a protected bundle image TLV (PBI TLV). When the bundle image is encrypted by using an encryption parameter that may be decrypted only by a specific SSP, the bundle image may be referred to as a bound bundle image (BBI) or a bound bundle image TLV (BBI TLV). The bundle image TLV may be a data set representing information constituting a profile in a tag-length-value (TLV) format.

In the disclosure, a local bundle management (LBM) may be referred to as a bundle local management, a local management, a local management command, a local command, a Local Bundle Management (LBM) Package, a bundle local management package, a local management package, a local management command package, or a local command package. The LBM may be used to change a state (enabled, disabled, or deleted) of a specific bundle or to update contents (e.g., a bundle nickname, bundle metadata, etc.) of the specific bundle through software installed in the terminal. The LBM may include at least one local management command, and in this case, bundles to be targets for the respective local management commands may be the same or different for each local management command.

In the disclosure, the RBM may be referred to as bundle remote management, remote management, a remote management command, a remote command, a remote bundle management package (RBM package), a bundle remote management package, a remote management package, a remote management command package, or a remote command package. The RBM may be used to change a state (enabled, disabled, or deleted) of a specific bundle or to update contents (e.g., a bundle nickname, bundle metadata, etc.) of the specific bundle. The RBM may include at least one remote management command, and bundles to be targets for the respective remote management commands may be the same or different for each remote management command.

In the disclosure, the term "target bundle" may be used to represent a bundle to be a target of the local management command or the remote management command In the disclosure, a certificate or a digital certificate may represent a digital certificate used for mutual authentication based on an asymmetric key including a pair of a public key (PK) and a secret key (SK). Each certificate may include at least one public key (PK), a public key identifier (PKID) corresponding to each PK, a certificate issuer ID of a certificate issuer (CI) that issued each certificate, and a digital signature. In addition, the CI may be referred to as a certification issuer, a certificate authority (CA), etc. In the disclosure, the PK and the PKID may be used as the same meaning representing a specific PK or a certificate including the specific PK, a part of the specific PK or a part of the certificate including the specific PK, a calculation result (e.g., a hash) value of the specific PK or a calculation result (e.g., a hash) value of the certificate including the specific PK, a calculation result (e.g., a hash) value of the part of the specific PK, or a calculation result (e.g., a hash) value of the part of the certificate including the specific PK, or a storage space in which pieces of data are stored.

In the disclosure, when certificates (primary certificates) issued by one CI are used to issue another certificate (secondary certificate), or secondary certificates are used to connectively issue tertiary or higher certificates, a correlation between the certificates may be referred to as a certificate chain or a certificate hierarchy, and in this case, a CI certificate used for issuing an initial certificate may be referred to as a root of certificate, a top-level certificate, a root CI, a root CI certificate, a root CA, a root CA certificate, or the like.

In the disclosure, a service provider may represent a business entity that issues a requirement to the secondary platform bundle manager to request generation of a bundle, and provides a service to a terminal through the bundle. For example, the service provider may represent a mobile operator that provides a mobile operator that provides a communication network access service through a bundle having a communication application installed therein, and may refer to all of a business supporting system (BSS), an operational supporting system (OSS), a point of sale (POS) terminal, and other information technology (IT) systems of the mobile operator. In addition, in the disclosure, the service provider is not limited to indicating only one specific business entity, and may be used as a term indicating a group or association (or consortium) of at least one business entity, or a representative representing the group or association. In addition, in the disclosure, the service provider may be referred to as an operator (OP or Op.), a Bundle Owner (BO), an Image Owner (IO), etc., and each service provider may configure or be assigned with at least one of a name and/or an OID. When the service provider indicates a group, an association (or consortium), or a representative of at least one business entity, a name or an OID of any group, association (or consortium), or representative may be a name or an OID shared by all business entities belonging to the group or association (or consortium), or all business entities cooperating with the representative.

In the disclosure, an AKA may indicate an authentication and key agreement, and may indicate an authentication algorithm for accessing $3^{rd}$ Generation Partnership Project (3GPP) and $3^{rd}$ Generation Partnership Project (3GPP2) networks.

In the disclosure, K (or a K value) may be an encryption key value stored in an eUICC used for an AKA authentication algorithm In the disclosure, an OPc may be a parameter value that may be stored in the eUICC used for the AKA authentication algorithm.

In the disclosure, an NAA refers to a network access application program and may be an application program such as a USIM or an ISIM stored in a UICC to access a network. The NAA may be a network access module.

In the disclosure, a telecom bundle may be a bundle equipped with at least one NAA or a function capable of remotely downloading and installing at least one NAA. In the disclosure, the telecom bundle may include a telecom bundle identifier indicating the telecom bundle.

Further, in describing the disclosure, when it is determined that a detailed description of known functions or configurations related to the disclosure may unnecessarily obscure the gist of the disclosure, the detailed description thereof will be omitted.

Hereinafter, one or more embodiments of a method and apparatus for installing and managing a bundle online through a remote server will be described.

FIG. 1 is a diagram illustrating a mobile communication network connection method performed by a terminal 110 by using an SSP 120 equipped with a telecom bundle having a profile, according to an embodiment of the disclosure.

Referring to FIG. 1, the SSP 120 may be embedded in a SoC 130 of the terminal 110. In this case, the SoC 130 may be a communication processor, an application processor, or a processor in which these two processors are integrated. Further, the SSP 120 may be of a removable type 122 having an independent chip form that is not integrated into the SoC 130, or an embedded type 124 which is pre-embedded in the terminal 110.

A bundle equipped with a profile may include "access information" that enables access to a specific communication company. For example, the access information may be an international mobile subscriber identity (IMSI), which is a subscriber classifier, and a K or Ki value required to authenticate a network together with the subscriber classifier.

The terminal 110 may perform authentication with an authentication processing system (e.g., a home location register (HLR) or an authentication center (AuC)) of a mobile carrier by using at least one of telecom bundles 140 and 150 installed in the SSP 120. For example, an authentication process may be an authentication and key agreement (AKA) process. When authentication succeeds, the terminal 110 may use a mobile communication service, such as the use of telephone calls or mobile data, by using a mobile communication network 160 of a mobile communication system. The two telecom bundles 140 and 150 may store different pieces of authentication information, and the terminal 110 may use a mobile communication network by operating the telecom bundles 140 and 150 simultaneously or in a time-division scheme according to configurations.

Further, the terminal 110 may use an online payment service through a terminal application or an offline payment service through an external credit card PoS device by using a payment bundle 170 installed in the SSP 120, and authenticate the identity of a terminal owner by using an electronic identification bundle 180.

Figure 2:
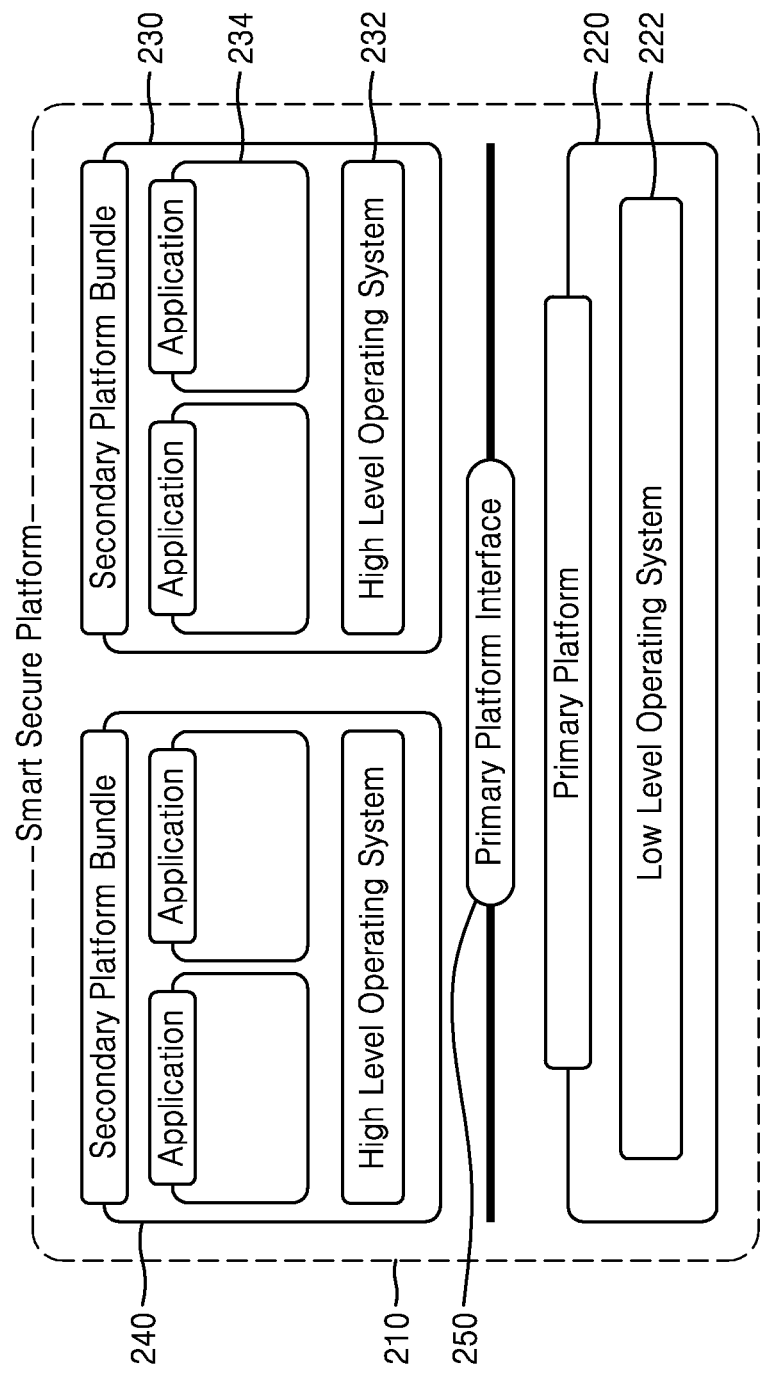
FIG. 2 is a conceptual diagram illustrating an internal structure of an SSP according to an embodiment of the disclosure.

FIG. 2 is a conceptual diagram illustrating an internal structure of an SSP 210 according to an embodiment of the disclosure.

Referring to FIG. 2, the SSP 210 may include a PP 220 and one or more SPBs 230 and 240 operating on the PP 220. The PP 220 may include hardware (not shown) and at least one LLOS 222. The SPB 230 may include a HLOS 232 and at least one application 234 operating on the HLOS 232. Each of the SPBs 230 and 240 may access resources of the PP 220, such as a central processing unit, a memory, etc., by using a primary platform interface (PPI) 250, and thus may be driven.

Figure 3:
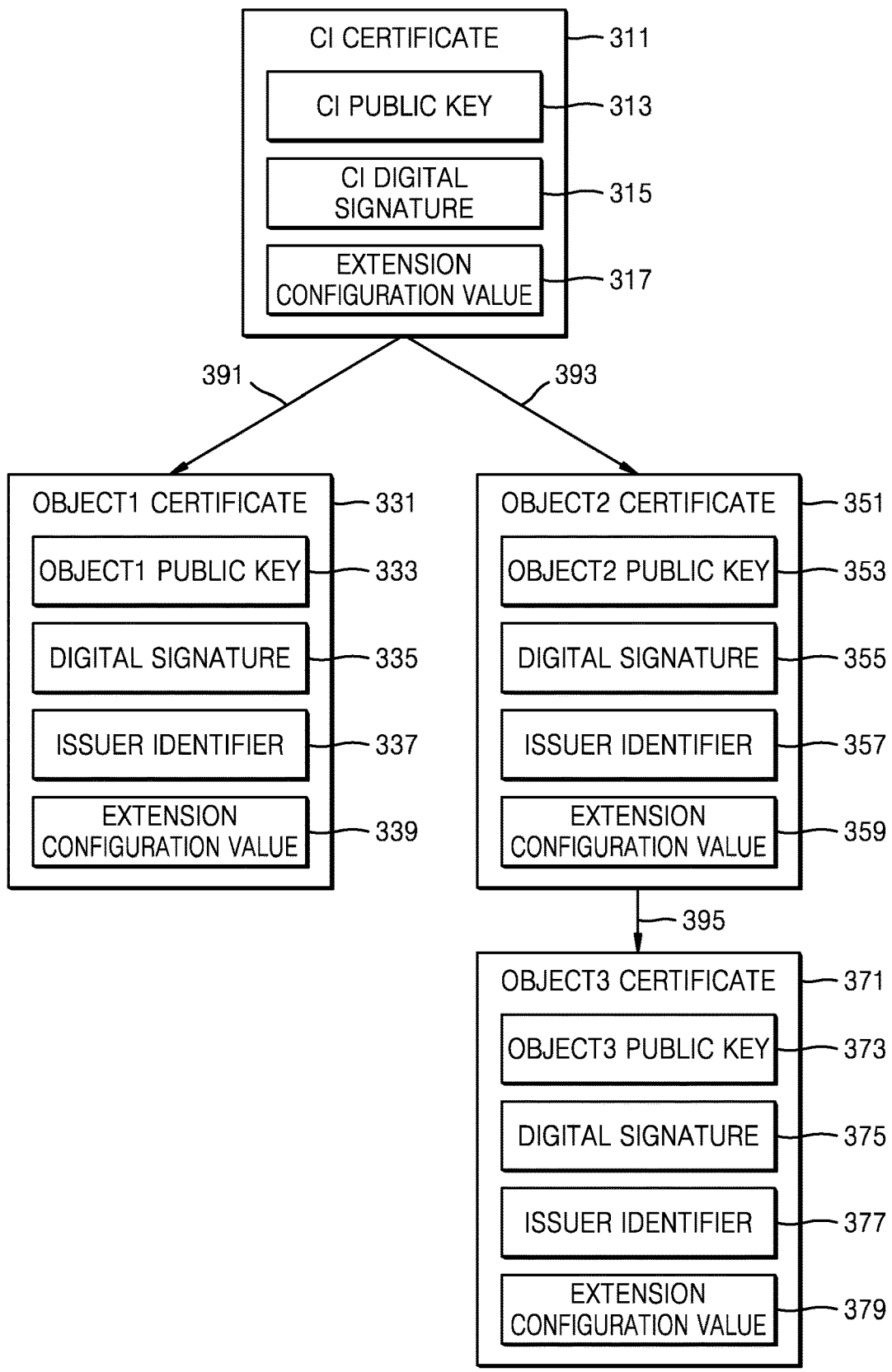
FIG. 3 is a diagram illustrating an example of a certificate hierarchy or a certificate chain related to a certificate by a certificate issuer (CI), a public key included in each certificate, and a digital signature of a CI, according to an embodiment of the disclosure.

FIG. 3 is a diagram illustrating an example of a certificate hierarchy or a certificate chain related to a certificate by a CI, a public key included in each certificate, and a digital signature of a CI, according to an embodiment of the disclosure. In the disclosure, the CI may be used together with a CA.

Referring to FIG. 3, the CI may generate a CI public key 313 and CI secret key to be used by the CI, generate a CI certificate 311 by including the CI public key 313 in its certificate, and attach a CI digital signature 315 generated by using its CI secret key to its CI certificate.

In addition, referring to FIG. 3, the CI certificate 311 may be used to issue 391 an Object1 certificate 331. An Object1 maybe, for example, an SPBM. The Object1 may generate an Object1 public key 333 and secret key to be used by the Object1, and generate the Object1 certificate 331 by including the Object 1 public key 333 in its certificate. The Object1 may request the CI to receive a CI digital signature 335 by using the CI secret key. Here, the Object1 certificate 331 may include a CI identifier 337 corresponding to the CI public key 313 which should be used when identifying the CI digital signature 335 included in the corresponding certificate. The CI identifier 337 may include at least one of a CI public key identifier (CI Public Key ID) or a CI identifier (CI ID, CI Object ID, Object Universally Unique Identifier, or Object UUID).

In addition, referring to FIG. 3, the CI certificate 311 may be used to issue 393 an Object2 certificate 351. An Object2 may be, for example, an SSP maker. The Object2 may generate an Object2 public key 353 and Object2 secret key to be used by the Object2, and generate the Object2 certificate 351 by including the Object2 public key 353 in its certificate. The Object2 may request the CI to receive a CI digital signature 355 by using the CI secret key. Here, the Object2 certificate 351 may include a CI identifier 357 corresponding to the CI public key 313 which should be used when identifying the CI digital signature 355 included in the corresponding certificate. The CI identifier 357 may include at least one of a CI public key identifier (CI Public Key ID) or a CI identifier (CI ID, CI Object ID, Object Universally Unique Identifier, or Object UUID). The CI digital signatures 335 and 355 included in the Object1 certificate 331 and the Object2 certificate 351 may be different values, but the CI identifiers 337 and 357 may be the same value.

In addition, referring to FIG. 3, the Object2 certificate 351 may be used to issue 395 an Object3 certificate 371. The Object3 may be, for example, an SSP manufactured by an SSP maker or an SPBL mounted inside the SSP. The Object3 may generate an Object3 public key 373 and Object3 secret key to be used by the Object3, and generate the Object3 certificate 371 by including the Object3 public key 373 in its certificate. The Object3 may request the Object2 to receive an Object2 digital signature 375 by using the Object2 secret key. Here, the Object3 certificate 371 may include a CI identifier 377 corresponding to the Object3 public key 353 which should be used when identifying the Object3 digital signature 375 included in the corresponding certificate. The CI identifier 377 may include at least one of an issuer public key identifier (Public Key ID) or an issuer identifier (Object ID, Object Universally Unique Identifier, or Object UUID).

Further, although not shown in FIG. 3, at least one sub-certificate issuer (sub CI) or sub-certificate authority (sub CA) may exist between the CI and the Object1 and between the CI and the Object2. A sub-issuer certificate may be issued by the CI by using the CI certificate 311, or may be issued by a sub CI by using its sub-issuer certificate. The sub CI may issue the Object1 certificate 331 or the Object2 certificate 351 by using its sub-issuer certificate.

Further, although not shown in FIG. 3, at least one sub CI or sub CA may exist between the Object2 and the Object3. The sub-issuer certificate may be issued by the Object2 by using the Object2 certificate 351, or may be issued by another sub CI by using its sub-issuer certificate. The sub CI may issue the Object2 certificate 351 or the Object3 certificate 371 by using its sub-issuer certificate.

Referring to FIG. 3, an extension configuration value 317, 339, 359, or 379 of each certificate 311, 331, 351, or 371 may include an SPB Family ID, or the SPB Family ID and an SPB Family Custodian Object ID of a bundle that is downloadable and installable with a corresponding certificate.

The Object1 certificate 331, the Object2 certificate 351, and the Object3 certificate 371 shown in the example of FIG. 3 may have the same CI certificate 311 as a top-level certificate or a root of certificate. Thus, the Object1, the Object2, and the Object3 may require the CI certificate 311 or the CI public key 313 included therein to authenticate each other. More specifically, in the example of FIG. 3, in order for the Object1 and the Object2 to authenticate each other by using their digital certificates and signatures, the Object1 may require a digital signature of the Object2, the Object2 certificate 351, and the CI public key 313, and the Object2 may require a digital signature of the Object1, the Object 1 certificate 331, and the CI public key 313. More specifically, in the example of FIG. 3, in order for the Object1 and the Object3 to authenticate each other by using their digital certificates and signatures, the Object1 may require a signature of the Object3, the Object3 certificate 371, and the CI public key 313, and the Object3 may require a signature of the Object1, the Object 1 certificate 331, and the CI public key 313. Here, with respect to the Object3 certificate 371, the Object2 certificate 351 may be referred to as a sub CI or sub CA certificate.

Figure 4:
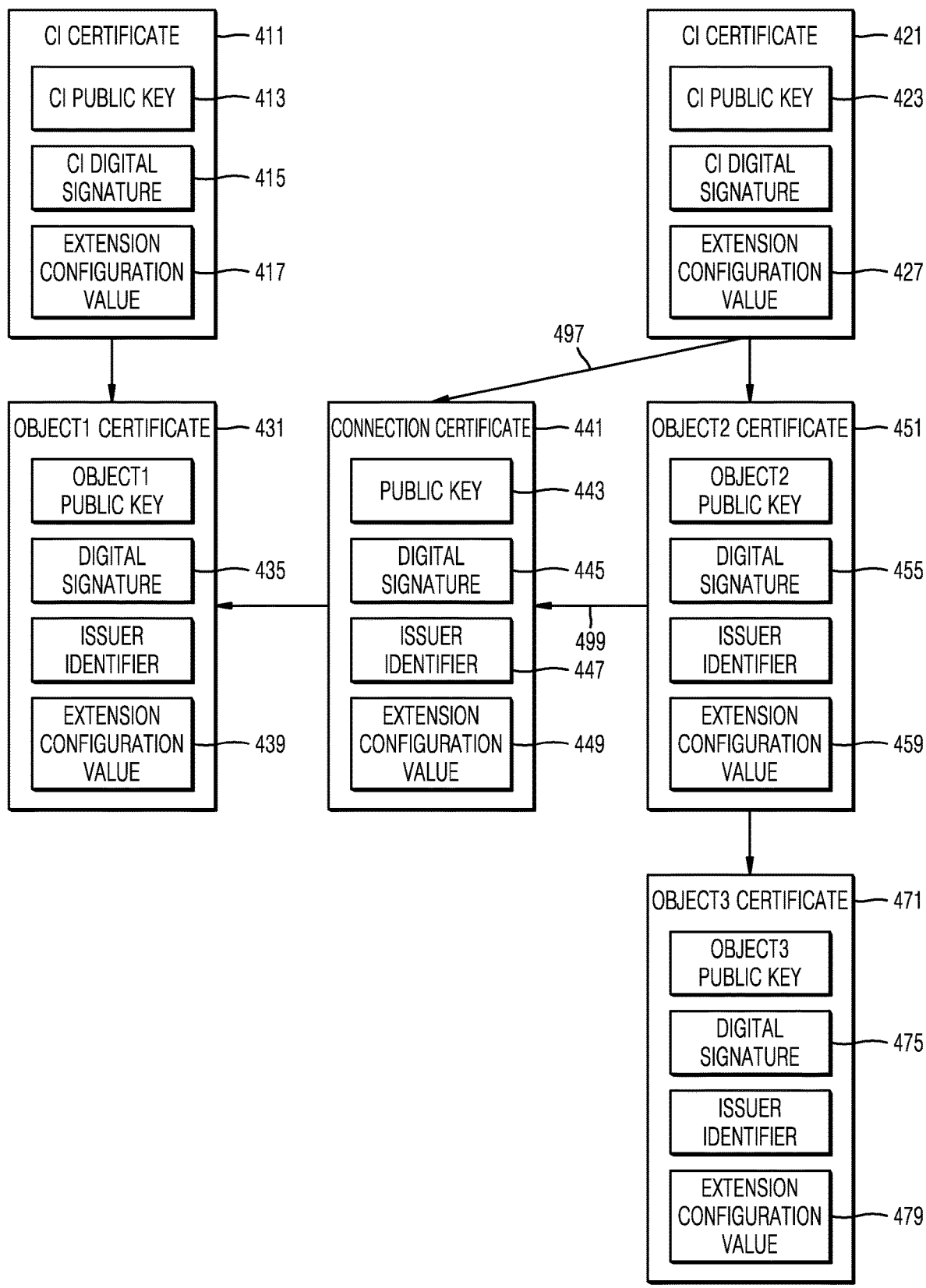
FIG. 4 is a diagram illustrating an example of a certificate hierarchy or a certificate chain related to a certificate issued by a CI, a public key included in each certificate, and a digital signature of a CI, according to an embodiment of the disclosure.

FIG. 4 is a diagram illustrating an example of a certificate hierarchy or a certificate chain related to a certificate issued by a CI, a public key included in each certificate, and a digital signature of a CI 415, according to an embodiment of the disclosure.

Referring to FIG. 4, a CI certificate 421 or an Object2 certificate 451 may be used to issue 497 and 499 a connection certificate 441. In addition, sub-issuer certificates (not shown) that may exist between the CI certificate 421 and the Object2 certificate 451, and between the Object2 certificate 451 and an Object3 certificate 471 may be used to issue the connection certificate 441. The connection certificate 441 may receive a digital signature 445 by using an issuer secret key. Here, the connection certificate 441 may include an CI identifier 447 corresponding to an issuer public key which should be used when identifying the digital signature 445 included in the corresponding certificate. The CI identifier 447 may include at least one of an issuer public key identifier (Public Key ID) or an issuer identifier (Object ID, Object Universally Unit Identifier, or Object UUID). A public key 443 of the connection certificate 441 may be a value corresponding to the issuer identifier 437 of an Object1 certificate 431, or an issuer identifier of each sub-issuer certificate (not shown) that may exist between a CI certificate 411 and the Object1 certificate 431. An extension configuration value 449 of the connection certificate 441 may include an SPB Family ID, or the SPB Family ID and an SPB Family Custodian Object ID of a bundle permitted by an issuer such that an Object1 may download the bundle to an Object3 with a corresponding certificate.

Referring to FIG. 4, an extension configuration value 417, 427, 439, 448, 459, or 479 of each certificate 411, 421, 431, 441, 451, or 471 may include an SPB Family ID, or the SPB Family ID and an SPB Family Custodian Object ID of a bundle that is downloadable and installable with the corresponding certificate.

Further, although not shown in FIG. 4, at least one sub CI or sub CA may exist between a CI and the Object1 and between the CI and an Object2. A sub-issuer certificate may be issued by the CI by using the CI certificate 311, or may be issued by another sub CI by using its sub-issuer certificate. The sub CI may issue the Object1 certificate 431 or the Object2 certificate 451 by using its sub-issuer certificate. An extension configuration value of the sub-issuer certificate may include an SPB Family ID, or the SPB Family ID and an SPB Family Custodian Object ID of a bundle that is downloadable and installable with the corresponding certificate.

Further, although not shown in FIG. 4, at least one sub CI or sub CA may exist between the Object2 and the Object3. The sub-issuer certificate may be issued by the Object2 by using the Object2 certificate 451, or may be issued by another sub CI by using its sub-issuer certificate. The sub CI may issue the Object2 certificate 451 or the Object3 certificate 471 by using its sub-issuer certificate.

Referring to FIG. 4, the Object1 certificate 431 and the Object2 certificate 451 may respectively have CI certificates 411 and 421, which are different from each other, as a top-level certificate or a root of certificate. Therefore, in order to authenticate the Object1, the Object2 and the Object3 may require the CI certificate 411 or a CI public key 413 included therein. In addition, in order to authenticate the Object2 and the Object3, the Object1 may require the CI certificate 421 or a CI public key 423 included therein. More specifically, in the example of FIG. 4, in order for the Object1 and the Object2 to authenticate each other by using their digital certificates and signatures, the Object1 may require a digital signature of the Object2 455, the Object2 certificate 451 and the CI public key 423, and the Object2 may require a digital signature of the Object1 435, the Object1 certificate 431, and the CI public key 413. In addition, in the example of FIG. 4, in order for the Object1 and the Object3 to authenticate each other by using their digital certificates and signatures, the Object1 may require a digital signature of the Object3 475, the Object3 certificate 471, the Object2 certificate 451, and the CI public key 423, and the Object3 may require the digital signature of the Object1, the Object1 certificate 431, and the CI public key 413.

Referring to FIG. 4, in order to authenticate the Object1, the Object3 may require the connection certificate 441 and the CI certificate 421 or the CI public key 423 included therein. More specifically, in the example of FIG. 4, in order to authenticate the Object1 by using the digital certificate and signature of the Object1, the Object3 may require the digital signature of the Object1, the Object1 certificate 431, the connection certificate 441, and the CI public key 423. In addition, in order to authenticate the OBject1, the Object3 may require the connection certificate 441, the Object2 certificate 451, and the CI certificate 421 or the CI public key 423 included therein. More specifically, in the example of FIG. 4, in order to authenticate the Object1 by using the digital certificate and signature of the Object1, the Object3 may require the digital signature of the Object1, the Object1 certificate 431, the connection certificate 441, the Object2 certificate 451, and the CI public key 423.

Figure 5:
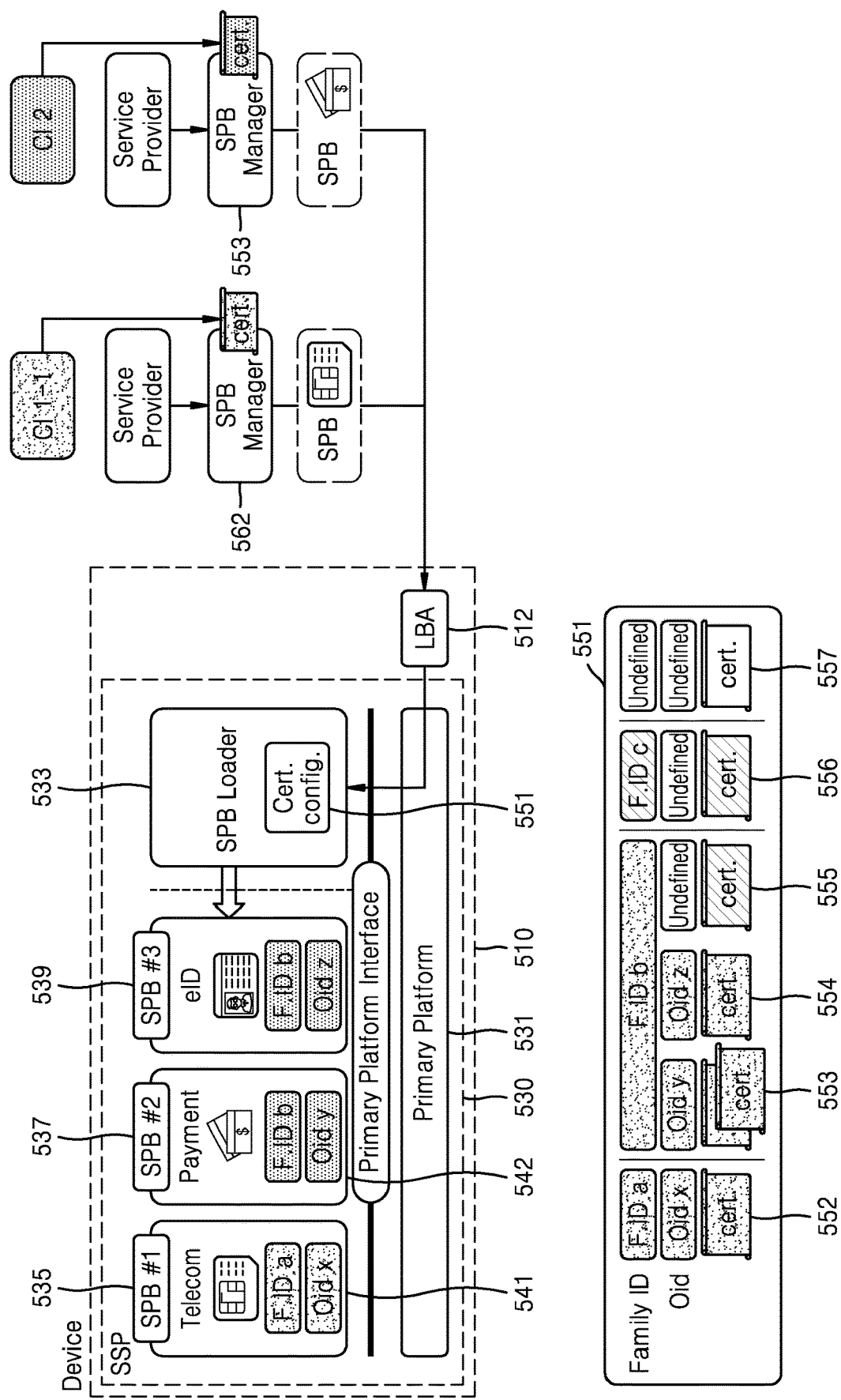
FIG. 5 is a diagram illustrating an example of internal and external components of a terminal for downloading a bundle to an SSP and installing the bundle in the SSP, according to an embodiment of the disclosure.

FIG. 5 is a diagram illustrating an example of internal and external components of a terminal 510 for downloading a bundle to an SSP 530 and installing the bundle in the SSP 530, according to an embodiment of the disclosure.

Referring to FIG. 5, the terminal 510 may be a terminal in which the SSP 530 is mounted and an LBA 512 for controlling the SSP 530 is installed. The SSP 530 may be embedded in or removable from the terminal 510. The SSP 530 may include a PP 531, an SPBL 533, and at least one SPB 535, 537, or 539. In addition, the at least one SPB 535, 537, or 539 is not installed inside the SSP 530 at the time of terminal shipment, but may be remotely downloaded and installed after shipment.

Referring to FIG. 5, each SPB may have a different SPB Family ID, or a different SPB Family ID and SPB Family Custodian Object ID 541 or 542. The SSP 530 or the SPBL 533 may store and manage a certificate configuration 551 that is allowed to download and install a bundle having a different SPB Family ID, or a different SPB Family ID and SPB Family Custodian Object ID. The LBA 512 may request the certificate configuration 551 from the SSP 530 or the SPBL 533, and the certificate configuration 551 may be duplicated and stored in the LBA 512.

Referring to FIG. 5, the SSP 530 or the SPBL 533 may store and manage certificate information 552, 553, or 554 to which different SPB Family IDs and different SPB Family Custodian Object IDs are assigned. The certificate information 552, 553, or 554 to which the SPB Family IDs and the SPB Family Custodian Object IDs are assigned may be used for downloading a bundle including the assigned SPB Family ID and SPB Family Custodian Object ID. The SSP 530 or the SPBL 533 may deny downloading and installing a bundle without the assigned SPB Family ID and SPB Family Custodian Object ID assigned to the corresponding certificate information 552, 553, or 554.

Referring to FIG. 5, the SSP 530 or the SPBL 533 may be assigned with different SPB Family IDs, and may store and manage certificate information 555 or 556 to which an SPB Family Custodian Object ID is not assigned. The certificate information 555 or 556 to which an SPB Family ID is assigned may be used for downloading a bundle including the assigned SPB Family ID.

Referring to FIG. 5, the SSP 530 or the SPBL 533 may store and mange certificate information 557 to which an SPB Family ID and an SPB Family Custodian Object ID are not assigned.

Referring to FIG. 5, certificate information 552, 553, 554, 555, 556, and 557 stored and managed by the SSP 530 or the SPBL 533 may be a CI certificate, a public key identifier of the CI certificate, a certificate existing on a certificate hierarchy issued by a CI, or a public key identifier of the corresponding certificate in FIG. 3 or 4. When bundles are downloaded from an SPBM 562 or 553 and installed, the SSP 530 or the SPBL 533 may select certificate information configured in an SPB Family ID, or the SPB Family ID and an SPB Family Custodian Object ID assigned to the bundle, and may transfer the certificate information to the SPBM 562 or 553. The certificate information may be a certificate or a public key of a CI of a corresponding certificate hierarchy, and may be an identifier (e.g., CI ID, CI Object ID, Object Universally Unique Identifier, Object UUID, CI Public Key ID) corresponding to the certificate and the public key.

Figure 6:
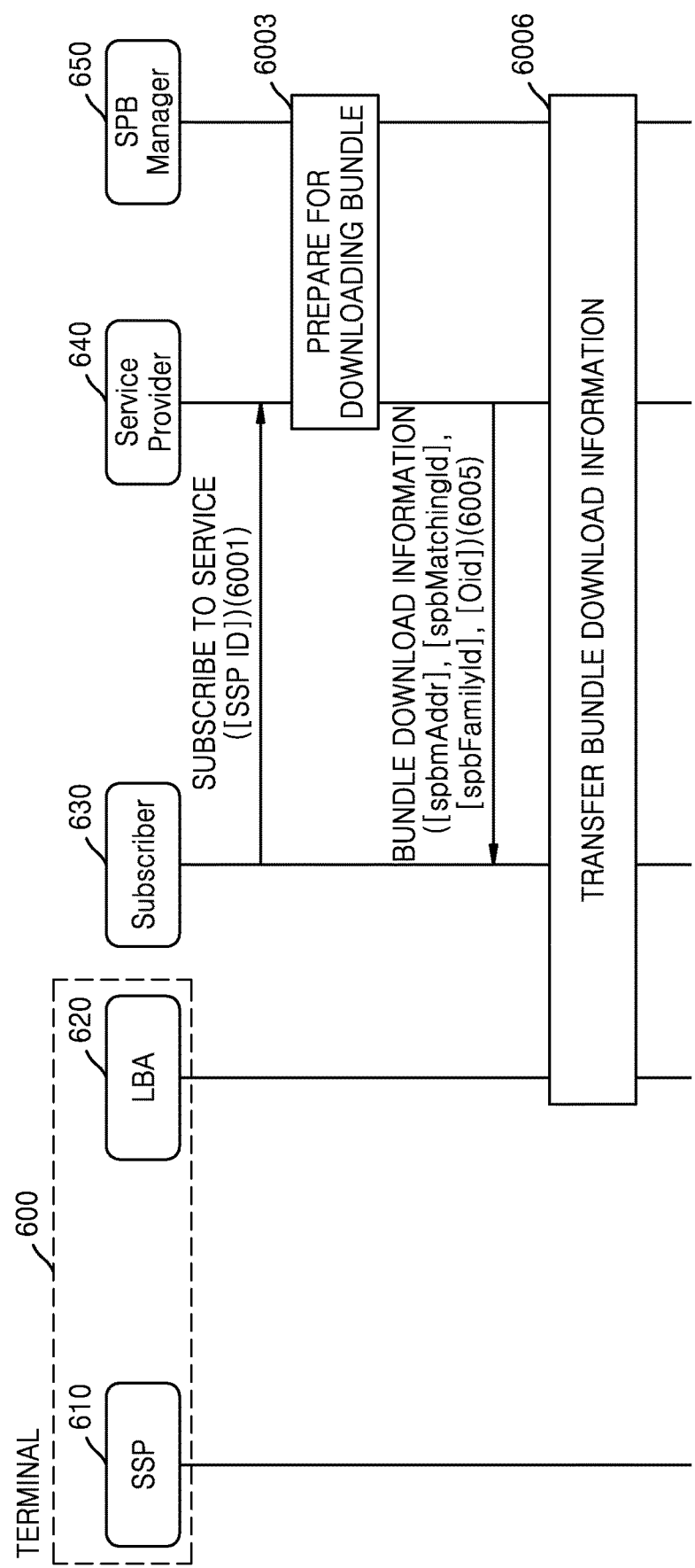
FIG. 6 is a diagram illustrating an example of a procedure in which a subscriber subscribes to a service through a service provider, and the service provider and a secondary platform bundle manager prepare for downloading a bundle, according to an embodiment of the disclosure.

FIG. 6 is a diagram illustrating an example of a procedure in which a subscriber 630 subscribes to a service through a service provider 640, and the service provider 640 and an SPBM 650 prepare for downloading a bundle, according to an embodiment of the disclosure.

Referring to FIG. 6, a terminal 600 may be a terminal in which an SSP 610 is mounted and an LBA 620 for controlling the SSP 610 is installed. In addition, although not shown in FIG. 6, a bundle requested by the service provider 640 may be generated and on standby in an SPBM 650, and the service provider 640 may have at least one of an SPB ID, an SPB Family ID, an SPB Family Custodian Object ID, or an address (SPBM Addr) of the SPBM 650.

Referring to FIG. 6, at operation 6001, the subscriber 630 may select and subscribe to a service (e.g., a data service through a mobile communication network) provided by the service provider 640. Here, in order to use the service provided by the service provider 640, the subscriber 630 may selectively transfer, to the service provider 640, an identifier (SSP ID) of the SSP 610 installed in the terminal 600 in which the bundle is to be installed.

At operation 6003, the service provider 640 and the SPBM 650 may perform a bundle download preparation procedure. At operation 6003, the service provider 640 may selectively transfer, to the SPBM 650, the identifier (SSP ID) of the SSP 610 in which the bundle is to be installed, and may transfer, to the SPBM 650, at least one of an SPB ID, SPB Family ID, or SPB Family Custodian Object ID of a specific bundle capable of providing the service selected by the subscriber 630, among bundles prepared in a server. At operation 6003, the SPBM 650 may select one of a bundle having the transferred specific SPB ID, a bundle having the SPB Family ID, and a bundle having the SPB Family ID and the SPB Family Custodian Object ID, and may transfer an identifier of the selected bundle to the service provider 640. The service provider 640 or the SPBM 650 may newly generate a bundle matching ID capable of identifying the selected bundle. In addition, the SPBM 650 may connect the transferred SSP ID to the selected bundle to manage the bundle connected with the SSP ID. At operation 6003, the SPBM 650 may transfer an SPBM Addr capable of downloading the selected bundle. Here, the SPBM Addr may be an address of the SPBM 650 itself, in which a prepared bundle is stored, or another SPBM 650, and may be an address of another SPBM 650 capable of storing and obtaining download information (e.g., a server address, etc.) of the prepared bundles.

Referring to FIG. 6, at operation 6005, the service provider 640 may transfer prepared bundle download information to the subscriber 630. The bundle download information may be configured to selectively transfer at least one of an SPBM Addr where the bundle is prepared, a bundle matching ID of the prepared bundle, an SPB Family ID of the prepared bundle, or an SPB Family Custodian Object ID of the prepared bundle.

Referring to FIG. 6, at operation 6006, the bundle download information may be transferred to the LBA 620 of the terminal 600. The bundle download information may be at least one of an SPBM Addr to which the LBA 620 is to access, a bundle classifier of the bundle prepared at operation 6003, an SPB Family ID of the prepared bundle, or an SPB Family Custodian Object ID of the prepared bundle. The bundle classifier may include at least one of the bundle matching ID generated at operation 6003, or a bundle event ID. In addition, the bundle classifier may include at least one of the SPB Family ID or SPB Family Custodian Object ID of the prepared bundle. The bundle event ID may include at least one of the bundle matching ID or SPBM Addr of the bundle prepared at operation 6003. The bundle download information may be input (e.g., QR code scanning, direct text input, etc.) to the LBA 620 by the subscriber 630, or input to the LBA 620 by using a push input through an information provision server (not shown). In addition, the LBA 620 may access the information provision server (not shown) pre-configured in the terminal 600 to receive the bundle download information.

FIG. 7A is a diagram illustrating an example of a certificate negotiating procedure for selecting a certificate that may be used for mutual authentication and encryption between a terminal 700 and an SPBM 750, according to an embodiment of the disclosure.

Referring to FIG. 7A, at operation 7001, an LBA 720 may request certificate information configured in an SSP 710. At operation 7001, the LBA 720 may selectively include an SPB Family ID and may also selectively include an SPB Family Custodian Object ID to request the certificate information configured in the SSP 710.

At operation 7001, the LBA 720 may request the SSP 710 for certificate information that the SSP 710 may use to download and install a bundle having a specific SPB Family ID and a specific SPB Family Custodian Object ID. At operation 7001, the LBA 720 may request the SSP 710 for certificate information including the specific SPB Family ID and the specific SPB Family Custodian Object ID. In addition, at operation 7001, the LBA 720 may request the SSP 710 for certificate information that the SSP 710 may use to download and install a bundle having the specific SPB Family ID. At operation 7001, the LBA 720 may request the SSP 710 for certificate information including the specific SPB Family ID. In addition, at operation 7001, the LBA 720 may request the SSP 710 for certificate information that the SSP 710 may use to download and install a bundle without an SPB Family ID and an SPB Family Custodian Object ID.

Referring to FIG. 7A, in the SSP 710, certificate information (SpbmVerification) that may be used by the SSP 710 to verify the SPBM 750 and pieces of certificate information (SpblVerification) that may be used by the SPBM 750 to verify the SSP 710 may be configured for each SPB Family ID and each SPB Family Custodian Object ID 7101 and 7102. In addition, certificate information 7200 to which the SPB Family ID is assigned but the SPB Family Custodian Object ID is not assigned may be configured in the SSP 710. Further, certificate information 7300 to which both the SPB Family ID and the SPB Family Custodian Object ID are not assigned may be configured in the SSPB.

The pieces of SpbmVerification that the SSP 710 may use to verify the SPBM 750 may mean certificate information that the SSP 710 may use to verify the validity of a certificate, certificate chain, and signature proposed by the SPBM 750. The pieces of SpblVerification that the SPBM 750 may use to verify the SSP 710 may mean certificate information that the SPBM 750 may use to verify the validity of a certificate issued to the SSP 710, a chain of the corresponding certificate, and a signature generated by the SSP 710.

Referring to FIG. 7A, at operation 7002, the SSP 710 may generate SSP certificate information (sspCiInfo) by extracting certificate information configured in the SPB Family ID and SPB Family Custodian Object ID provided by the LBA 720, and at operation 7003, may transfer the sspCiInfo to the LBA 720. The sspCiInfo may include an SPB Family ID, an SPB Family Custodian Object ID, pieces of SpbmVerification that may be used by an SSP 710 configured in the corresponding SPB Family ID and SPB Family Custodian Object ID to verify the SPBM 750, and pieces of SpblVerification that may be used by the SPBM 750 to verify the SSP 710. In addition, at operation 7001, when the SPB Family ID and the SPB Family Custodian Object ID are not transferred from the LBA 720 to the SSP 710, SSP certificate information (sspCiInfo) including all certificate information may be generated.

In addition, although not shown in FIG. 7A, at operation 7003, the SSP 710 may transfer, to the LBA 720, SSP version information including at least one of version information of a standard supported by a PP or version information of a standard supported by an SPBL, the PP and the SPBL being included in the SSP 710.

At operation 7003, the SSP 710 may transfer, to the LBA 720, an identifier (e.g., a part number (PN)) indicating design and configuration information of the SSP 710.

In addition, although not shown in FIG. 7A, at operation 7003, the LBA 720 may generate sspCiInfo by extracting certificate information of the SSP 710 assigned to a specific bundle manager identifier, or the SPB Family ID and the SPB Family Custodian Object ID, based on certificate information transferred from the SSP 710 or pre-stored certificate configuration information of the SSP 710.

Further, in FIG. 7A, after operation 7002 is completed, before operation 7003, the SSP 710 may inform the LBA 720 that operation 7002 is completed. In addition, after the LBA 720 is informed that operation 7002 is completed, the LBA 720 may request the SSP 710 to transfer the information generated at operation 7002 before operation 7003.

Referring to FIG. 7A, at operation 7004, the LBA 720 and the SPBM 750 may perform a transport layer security (TLS) connection. The TLS connection at operation 7004 may use a server authentication method in which the LBA 720 checks the identity of the SPBM 750, among TLS connection methods. At the time of the TLS connection at operation 7004, when the LBA 720 checks the identity of the SPBM 750, the SPBM 750 may submit a TLS certificate to the LBA 720. At least one CI certificate or public key for verifying the validity of the TLS certificate may be stored in the LBA 720 or the terminal 700. When at least one sub CI certificate is needed to verify the validity of the TLS certificate of the SPBM 750, at operation 7004, the SPBM 750 may submit at least one sub CI certificate together with the TLS certificate to the LBA 720. When the TLS connection is established, all messages between the LBA 720 and the SPBM 750 thereafter may be protected by a TLS security procedure.

At operation 7005, the LBA 720 may request the SPBM 750 to start negotiating a certificate. At operation 7005, the LBA 720 may transfer, to the SPBM 750, certificate information supportable by the SSP 710 based on the SSP certificate information (sspCiInfo) of the SSP 710 transferred at operation 7003. In addition, although not shown in FIG. 7A, at operation 7005, the LBA 720 may additionally transfer the SSP version information to the SPBM 750. Further, although not shown in FIG. 7A, at operation 7005, the LBA 720 may additionally transfer, to the SPBM 750, the design and configuration information identifier (e.g., the PN) of the SSP 710.

Although not shown in FIG. 7A, in the SPBM 750, SpbmVerification on the CI certificate or certificate sub-issuer certificates used for issuing a certificate to the SPBM 750, and SpblVerification of an SSP certificate issuance CI or certificate sub-issuers trusted by the SPBM 750 may be configured for each SPB Family ID and each SPB Family Custodian Object ID. The SPBM 750 may provide, to the LBA 720, the corresponding certificate of the CI certificate or certificate sub-issuer certificates used for issuing the certificate to the SPBM 750 for mutual authentication with the SSP 710.

In addition, the certificate information (SpblVerification) of the SSP certificate issuance CI or certificate sub-issuers trusted by the SPBM 750 may mean certificate information that the SPBM 750 may verify the validity of the certificate provided by the SSP 710, and may also mean that an SSP certificate may be verified when the SSP certificate existing in a corresponding certificate hierarchy is transferred to the SPBM 750 through the LBA 720 for mutual authentication between the SSP 710 and the SPBM 750. Here, the certificate information may include at least one of a CI public key identifier (Public Key ID) or a certificate identifier (Certificate ID, Object ID, Object Universally Unique Identifier, or Object UUID).

At operation 7006, the SPBM 750 compares certificate information configured in the SPBM 750 with certificate information of the SSP 710 based on the sspCiInfo of the SSP 710 transferred at operation 7005, and may select an SPB Family ID, an SPB Family Custodian Object ID, an SPBM certificate to be transferred to the terminal 700, and certificate information (sspCiToBeUsed) to be used by the SSP 710.

Here, the SPBM certificate to be transferred to the terminal 700 may be a certificate (CERT.SPBM.KA) for key agreement or a certificate (CERT.SPBM.DS) for digital signature. In addition, the SPBM certificate to be transferred to the terminal 700 may be an SPBM certificate existing in a certificate hierarchy of at least one of common information of pieces of SpbmVerification that may be used by the SSP 710 to verify the SPBM 750 or pieces of SpbmVerification on the CI certificate or certificate sub-issuer certificates used for issuing the certificate to the SPBM 750, transferred to the SPBM 750 at operation 7005.

The sspCiToBeUsed may include at least one of common certificate information of the pieces of SpbmVerification that may be used by the SSP 710 to verify the SPBM 750 or the pieces of SpbmVerification on the CI certificate or certificate sub-issuer certificates used for issuing the certificate to the SPBM 750, transferred to the SPBM 750 at operation 7005.

At operation 7007, the SPBM 750 may return, to the LBA 720, the SPBM certificate and certificate information selected at operation 7006. At operation 7007, the information returned to the LBA 720 may include at least one of the SPBM certificate verifiable by the SSP 710, sspCiToBeUsed, SPB Family ID, or SPB Family Custodian Object ID selected at operation 7006. In addition, when at least one sub CI certificate is needed to determine whether the SPBM certificate is valid, the information returned to the LBA 720 may include at least one sub CI certificate together with the SPBM certificate.

Further, the information returned to the LBA 720 at operation 7007 may include a server challenge (spbmChallange) that may be selectively used for mutual authentication between the SSP 710 and the SPBM 750 after operation 7007. In addition, the information returned to the LBA 720 at operation 7007 may selectively include a digital signature of the SPBM 750 transferred to guarantee the integrity of the returned information, and in this case, an SPBM certificate (CERT.SPBM.DS) for signing, which may determine whether the corresponding digital signature is valid may be included together. Here, the CERT.SPBM.DS may be a certificate existing in the same CI hierarchy as the SPBM certificate selected at operation 7006. In addition, where at least one sub CI certificate is needed to determine whether the SPBM certificate is valid, the information returned to the LBA 720 may include at least one sub CI certificate together with the SPBM certificate.

Figure 7B:
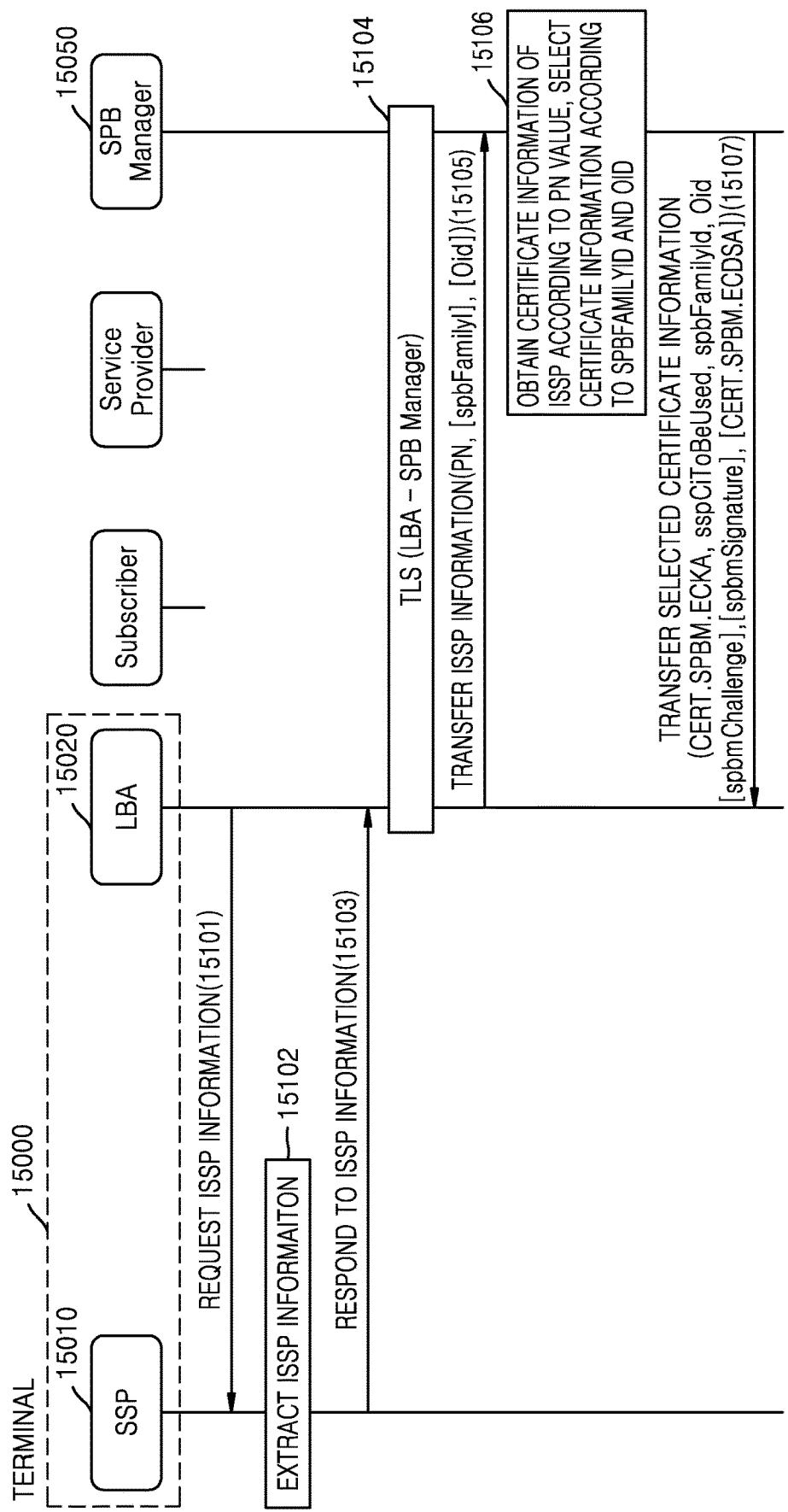
FIG. 7B is a diagram illustrating an example of a certificate negotiating procedure for selecting a certificate that may be used for mutual authentication and encryption between a terminal and a secondary platform bundle manager, according to an embodiment of the disclosure.

FIG. 7B is a diagram illustrating an example of a certificate negotiating procedure for selecting a certificate that may be used for mutual authentication and encryption between a terminal 15000 and an SPBM 15050, according to an embodiment of the disclosure.

Referring to FIG. 7B, at operation 15101, an LBA 15020 may request, from an SSP 15010, a design and configuration information identifier (e.g., a PN) of the SSP 15010.

Referring to FIG. 7B, at operation 15102, the SSP 15010 may extract an identifier indicating design and configuration information, and at operation 15103, may transfer the corresponding information to the LBA 15020. In addition, although not shown in FIG. 7B, at operation 15102, the SSP 15010 may transfer, to the LBA 15020, SSP version information including at least one of version information of a standard supported by a PP or version information of a standard supported by an SPBL, the PP and the SPBL being included in the SSP 15010.

Referring to FIG. 7B, at operation 15104, the LBA 15020 and the SPBM 15050 may perform a TLS connection. The TLS connection at operation 15104 may use a server authentication method in which the LBA 15020 checks the identity of the SPBM 15050, among TLS connection methods. At the time of the TLS connection at operation 15104, when the LBA 15020 checks the identity of the SPBM 15050, the SPBM 15050 may submit a TLS certificate to the LBA 15020. At least one CI certificate or public key for verifying the validity of the TLS certificate may be stored in the LBA 15020 or the terminal 15000. When at least one sub CI certificate is needed to verify the validity of the TLS certificate of the SPBM 15050, at operation 15004, the SPBM 15050 may submit at least one sub CI certificate together with the TLS certificate to the LBA 15020. When the TLS connection is established, all messages between the LBA 15020 and the SPBM 15050 thereafter may be protected by a TLS security procedure.

At operation 15105, the LBA 15020 may request the SPBM 15050 to start negotiating a certificate. At operation 15105, the LBA 15020 may transfer, to the SPBM 15050, at least one of the design and configuration information identifier (e.g., the PN) of the SSP 15010 transferred at operation 15103, an SPB Family ID, or an SPB Family Custodian Object ID. At operation 15105, the LBA 15020 may additionally transfer SSP version information to the SPBM 15050.

At operation 150106, the SPBM 15050 may obtain certificate configuration information of the SSP 15010 from the SPBM 15050 itself or a third storage (not shown) by using the design and configuration information identifier of the SSP 15010 transferred at operation 15105. Here, the SPBM 15050 may obtain certificate information of the SSP 15010 assigned to a corresponding SPBM Family ID and SPBM Family Custodian Object ID of the SSP 15010 by additionally using the SPBM Family ID and the SPBM Family Custodian Object ID. The SPBM 15050 may compare certificate information configured in the SPBM 15050 with the certificate information of the SSP 15010, and may select an SPBM Family ID, an SPBM Family Custodian Object ID, an SPBM certificate to be transferred to the terminal 15010, certificate information (sspCiToBeUsed) to be used by the SSP 15010, etc.

At operation 15107, the SPBM 15050 may return, to the LBA 15020, the SPBM certificate and certificate information selected at operation 15106. At operation 15107, the information returned to the LBA 15020 may include at least one of the SPBM certificate verifiable by the SSP 15010, sspCiToBeUsed, SPB Family ID, or SPB Family Custodian Object ID selected at operation 15106. In addition, when at least one sub CI certificate is needed to determine whether the SPBM certificate is valid, the information returned to the LBA 15020 may include at least one sub CI certificate together with the SPBM certificate.

Further, the information returned to the LBA 15020 at operation 15107 may include a server challenge (spbmChallenge) that may be selectively used for mutual authentication between the SSP 15010 and the SPBM 15050 after operation 15107. In addition, the information returned to the LBA 15020 at operation 15107 may selectively include a digital signature of the SPBM 15050 transferred to guarantee the integrity of the returned information, and in this case, an SPBM certificate (CERT.SPBM.DS) for signing, which may determine whether the corresponding digital signature is valid may be included together. Here, the CERT.SPBM.DS may be a certificate existing in the same CI hierarchy as the SPBM certificate selected at operation 15106. In addition, where at least one sub CI certificate is needed to determine whether the SPBM certificate is valid, the information returned to the LBA 15020 may include at least one sub CI certificate together with the SPBM certificate.

Figure 8:
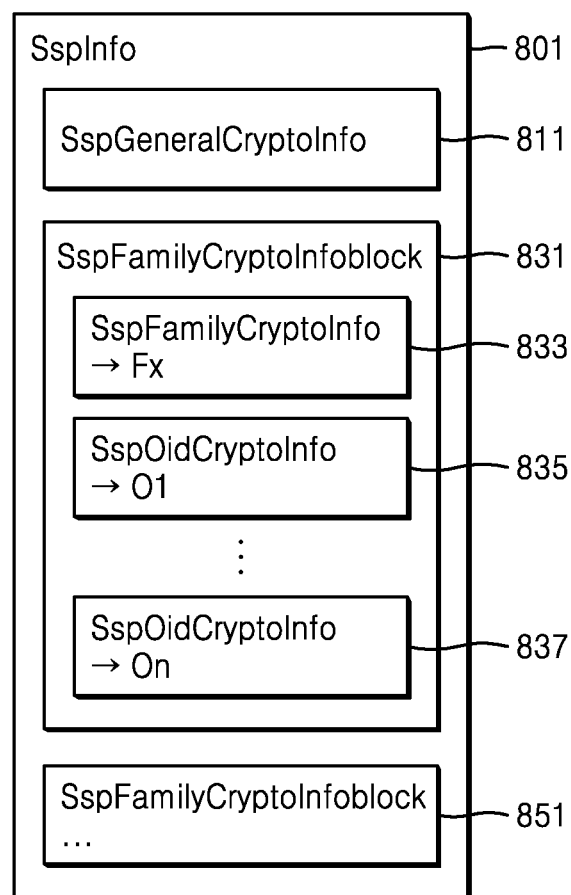
FIG. 8 is a diagram illustrating an example of a structure of certificate information generated by an SSP or a secondary platform bundle loader (SPBL), or transferred by a local bundle assistant (LBA) to a secondary platform bundle manager, according to an embodiment of the disclosure.

FIG. 8 is a diagram illustrating an example of a structure of certificate information generated by an SSP or an SPBL, or transferred by an LBA to a secondary platform bundle manager, according to an embodiment of the disclosure.

Referring to FIG. 8, SSP certificate information may be included in SSP information (SspInfo) 801 transferred from an SSP to an SPBM. The SSP certificate information may include general certificate information (SspGeneralCryptoInfo) 811, bundle family certificate information (SspFamilyCryptoInfo) 833, and bundle family custodian certificate information (SspOidCryptoInfo) 835 or 837. The SspGeneralCryptoInfo 811 may include bundle family certificate information block (SspFamilyCryptoInfoblock) 831, and the SspFamilyCryptoInfoblock 831 may include the SspFamilyCryptoInfo 833 and the SspOidCryptoInfo 835 or 837.

Referring to FIG. 8, the SspGeneralCryptoInfo 811 may include certificate information to which an SPB Family ID and SPB Family Custodian Object ID that are stored and managed in the SSP are not assigned. Here, the certificate information may include pieces of certificate information (SpbmVerification) that may be used by the SSP to verify the SPBM and pieces of certificate information (SpblVerification) that may be used by the SPBM to verify the SSP.

Referring to FIG. 8, the SspFamilyCryptoInfoblock 831 may include at least one SPB Family ID. The SspFamilyCryptoInfo 833 may selectively include, among pieces of certificate information stored in the SSP, certificate information to which an SPB Family ID is assigned but an SPB Family Custodian Object ID is not assigned. The SspFamilyCryptoInfo 833 may selectively include, among the pieces of certificate information stored in the SSP, certificate information to which an SPB Family ID included in the Ssp- FamilyCryptoInfoblock 831 or an SPB Family ID included in the SspFamilyCryptoInfo 833 is assigned but an SPB Family Custodian Object ID is not assigned. Here, the certificate information may include pieces of SpbmVerification that may be used by the SSP to verify the SPBM and pieces of SpblVerification that may be used by the SPBM to verify the SSP.

Referring to FIG. 8, the SspOidCryptoInfo 835 may include at least one SPB Family Custodian Object ID. The SspOidCryptoInfo 835 may selectively include, among the pieces of certificate information stored in the SSP, certificate information to which an SPB Family ID and an SPB Family Custodian Object ID are assigned. The SspOidCryptoInfo 835 may selectively include, among the pieces of certificate information, certificate information to which an SPB Family ID included in the SspOidCryptoInfo 835 or an SPB Family ID included in the SspFamilyCryptoInfo 833, and an SPB Family Custodian Object ID included in the SspOidCryptoInfo are assigned. Here, the certificate information may include pieces of SpbmVerification that may be used by the SSP to verify the SPBM and pieces of SpblVerification that may be used by the SPBM to verify the SSP.

Referring to FIG. 8, the SspInfo 801 may include at least one SspFamilyCryptoInfoblock 831 or 851. More specifically, the SspInfo 801 may not include the SspFamilyCryptoInfoblock 831 or 851 and the SspFamilyCryptoInfoblock 831 or may include at least one of them, according to configurations 7101, 7102, 7200, and 7300 of the SSP. In addition, the SspFamilyCryptoInfoblock 831 may include at least one SspOidCryptoInfo 835 or 837.

Figure 9:
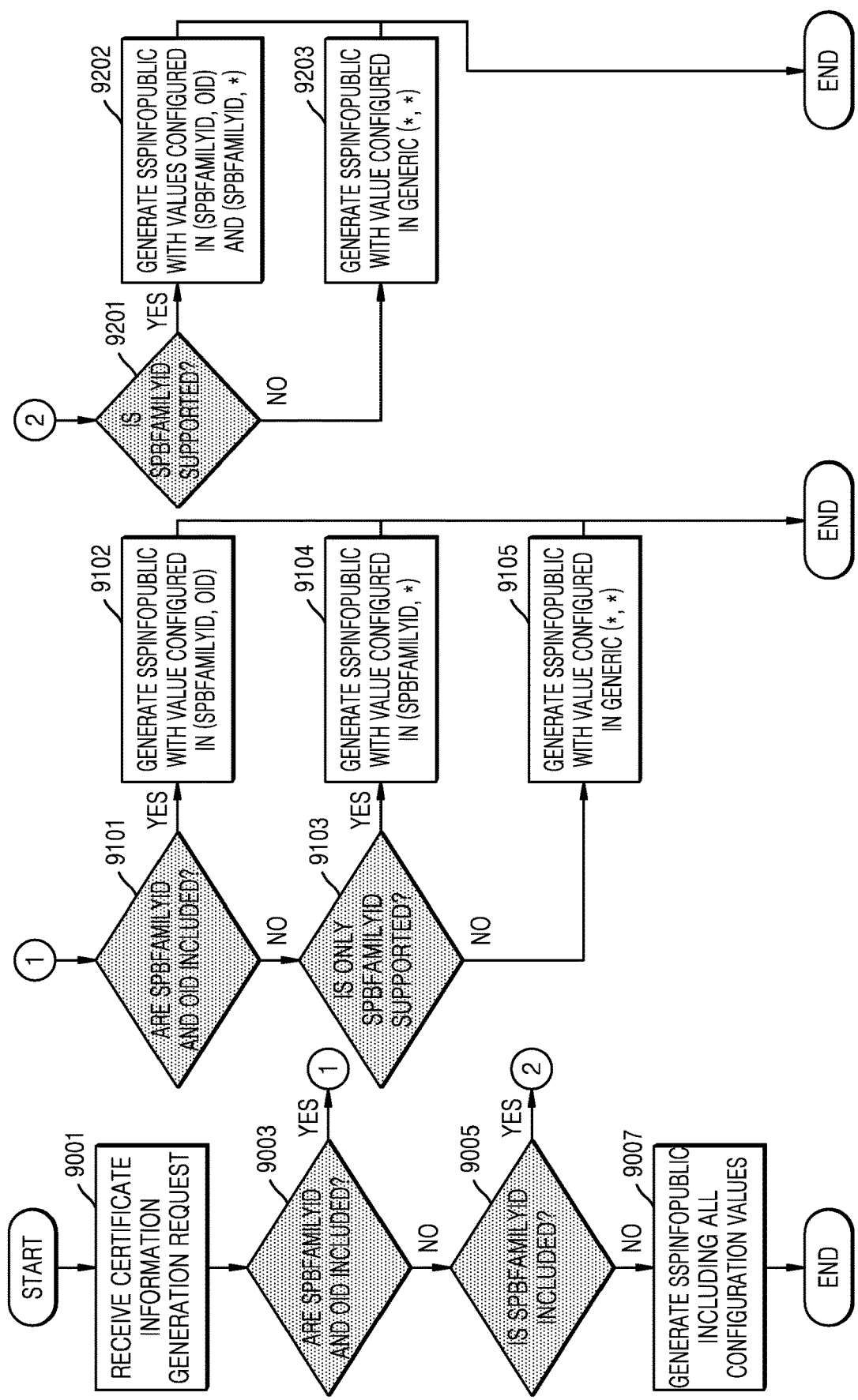
FIG. 9 is a diagram illustrating an example of a procedure in which an SSP of a terminal generates supportable certificate information configured for a specific secondary platform bundle family identifier and secondary platform bundle family custodian identifier according to a request of an LBA, according to an embodiment of the disclosure.

FIG. 9 is a diagram illustrating an example of a procedure in which an SSP of a terminal generates supportable certificate information configured for a specific SPB Family ID, or a specific SPB Family ID and SPB Family Custodian Object ID according to a request of an LBA, according to an embodiment of the disclosure. FIG. 9 may correspond to an embodiment of the detailed procedure of operation 7002 of FIG. 7A.

Referring to FIG. 9, at operation 9001, the SSP may receive a request for certificate information from an LBA. At operation 9003, the SSP may determine whether a specific SPB Family ID and SPB Family Custodian Object ID are included in the request for certificate information received from the LBA.

When the specific SPB Family ID and SPB Family Custodian Object ID are included in the request for certificate information, the SSP may proceed to operation 9101 to determine whether the corresponding SPB Family ID and SPB Family Custodian Object ID are supported. That is, the SSP may determine whether certificate information configured in the corresponding SPB Family ID and SPB Family Custodian Object ID exists. For example, referring to FIG. 7A, when the SPB Family ID and the SPB Family Custodian Object ID are input, such as (FID1, Oid1), the SSP may determine that the corresponding SPB Family ID and SPB Family Custodian Object ID are supported. Alternatively, when the SPB Family ID and the SPB Family Custodian Object ID are input, such as (FID2, Oid6), the SSP may determine that the corresponding SPB Family ID and SPB Family Custodian Object ID, in particular, the SPB Family ID are not supported. When the certificate information exists at operation 9101, at operation 9102, the SSP may generate the SspInfo 801 of FIG. 8 by including the corresponding SPB Family ID and SPB Family Custodian Object ID, and the certificate information configured in the corresponding SPB Family ID and SPB Family Custodian Object ID, In addition, the SSP may include the corresponding SPB Family ID in the SspFamilyCryptoInfoblock 831 of the SspInfo 801 of FIG. 8. Further, the SSP may generate the SspOidCryptoInfo 835 by including the corresponding SPB Family Custodian Object ID in the SspOidCryptoInfo 835 and including the certificate information configured in the corresponding SPB Family ID and SPB Family Custodian Object ID.

Referring to FIG. 9, when the certificate information configured in the corresponding SPB Family ID and SPB Family Custodian Object ID does not exist at operation 9101, at operation 9103, the SSP may determine whether certificate information including the corresponding SPB Family ID exists. For example, referring to FIG. 7A, when the SPB Family ID and the SPB Family Custodian Object ID are input, such as (FID2, Oid6), the SSP may proceed to operation 9103 by determining that the corresponding SPB Family ID and SPB Family Custodian Object ID, in particular, the SPB Family ID are not supported. Thereafter, at operation 9103, the SSP may select a value configured to (FID2, *) by determining that only the corresponding SPB Family ID is supported. When the certificate information exists at operation 9103, at operation 9104, the SSP may generate the SspInfo 801 of FIG. 8 by including the corresponding SPB Family ID and certificate information configured in the corresponding SPB Family ID. In addition, the SSP may include the corresponding SPB Family ID in the SspFamilyCryptoInfoblock 831 of the SspInfo 801 of FIG. 8. In addition, the SSP may generate the SspFamilyCryptoInfo 833 by including the certificate information configured in the SPB Family ID.

Referring to FIG. 9, when the certificate information configured in the corresponding SPB Family ID does not exist at operation 9103, at operation 9105, the SSP may generate the SspInfo 801 of FIG. 8 by including certificate information to which an SPB Family ID and an SPB Family Custodian Object ID are assigned. For example, referring to FIG. 7A, when the SPB Family ID and the SPB Family Custodian Object ID are input, such as (FID3, Oid1), the SSP may determine that the SPB Family ID is also not supported and may select a value configured to (*, *). In addition, the SSP may generate SspGeneralCryptoInfo 811 by including the certificate information to which the SPB Family ID and SPB Family Custodian Object ID that are stored and managed in the SSP are not assigned.

Referring to FIG. 9, when the SPB Family Custodian Object ID does not exist at operation 9003, at operation 9005, the SSP may determine whether the SPB Family ID is included in the request for certificate information received from the LBA. For example, referring to FIG. 7A, when only FID is input, Oid does not exist, and thus, the SSP may proceed to operation 9005.

When a specific SPB Family ID is included in the certificate information at operation 9005, at operation 9201, the SSP may determine whether a certificate configuration including the corresponding SPB Family ID exists. For example, referring to FIG. 7A, when only FID2 is input, the SSP may determine whether SSP configuration information having FID2, for example, 7102 and 7200 exists. The certificate configuration including the corresponding SPB Family ID may mean certificate information to which the corresponding SPB Family ID and SPB Family Custodian Object ID are assigned, or certificate information to which the corresponding SPB Family ID is assigned but the corresponding SPB Family Custodian Object ID is not assigned.

At operation 9201, when certificate information configured in the corresponding SPB Family ID and at least one SPB Family Custodian Object ID exists, the SSP may generate the SspInfo 801 of FIG. 8 by including the corresponding SPB Family ID and SPB Family Custodian Object ID, and the configured certificate information. In addition, the SSP may include the corresponding SPB Family ID in the SspFamilyCryptoInfoblock 831 of the SspInfo 801 of FIG. 8. Further, the SSP may generate at least one SspOidCryptoInfo 835 by including the SPB Family Custodian Object ID and the certificate information configured in the SPB Family ID and the SPB Family Custodian Object ID. When at least a plurality of pieces of certificate information are mapped to the SspOidCryptoInfo, the SSP may generate a plurality of pieces of SspOidCryptoInfo 835.

In addition, at operation 9201, when certificate information to which the corresponding SPB Family ID is assigned but the corresponding SPB Family Custodian Object ID is not assigned exists, at operation 9202, the SSP may generate the SspInfo 801 of FIG. 8 by including the corresponding certificate information. The SSP may include the corresponding SPB Family ID in the SspFamilyCryptoInfoblock 831 of the SspInfo 801 of FIG. 8. In addition, the SSP may generate the SspFamilyCryptoInfo 833 by including the certificate information configured in the SPB Family ID.

At operation 9201, when the certificate configuration including the corresponding SPB Family ID does not exist, at operation 9203, the SSP may generate the SspInfo 801 of FIG. 8 by including certificate information to which the SPB Family ID and the SPB Family Custodian Object ID are not assigned. In addition, the SSP may generate SspGeneralCryptoInfo 811 by including the certificate information to which the SPB Family ID and SPB Family Custodian Object ID that are stored and managed in the SSP are not assigned.

Referring to FIG. 9, in a case where the SPB Family ID does not exist at operation 9005, for example, when there is no input, at operation 9007, the SSP may generate the SspInfo 801 by including the entire certificate information configured in the SSP.

Figure 10:
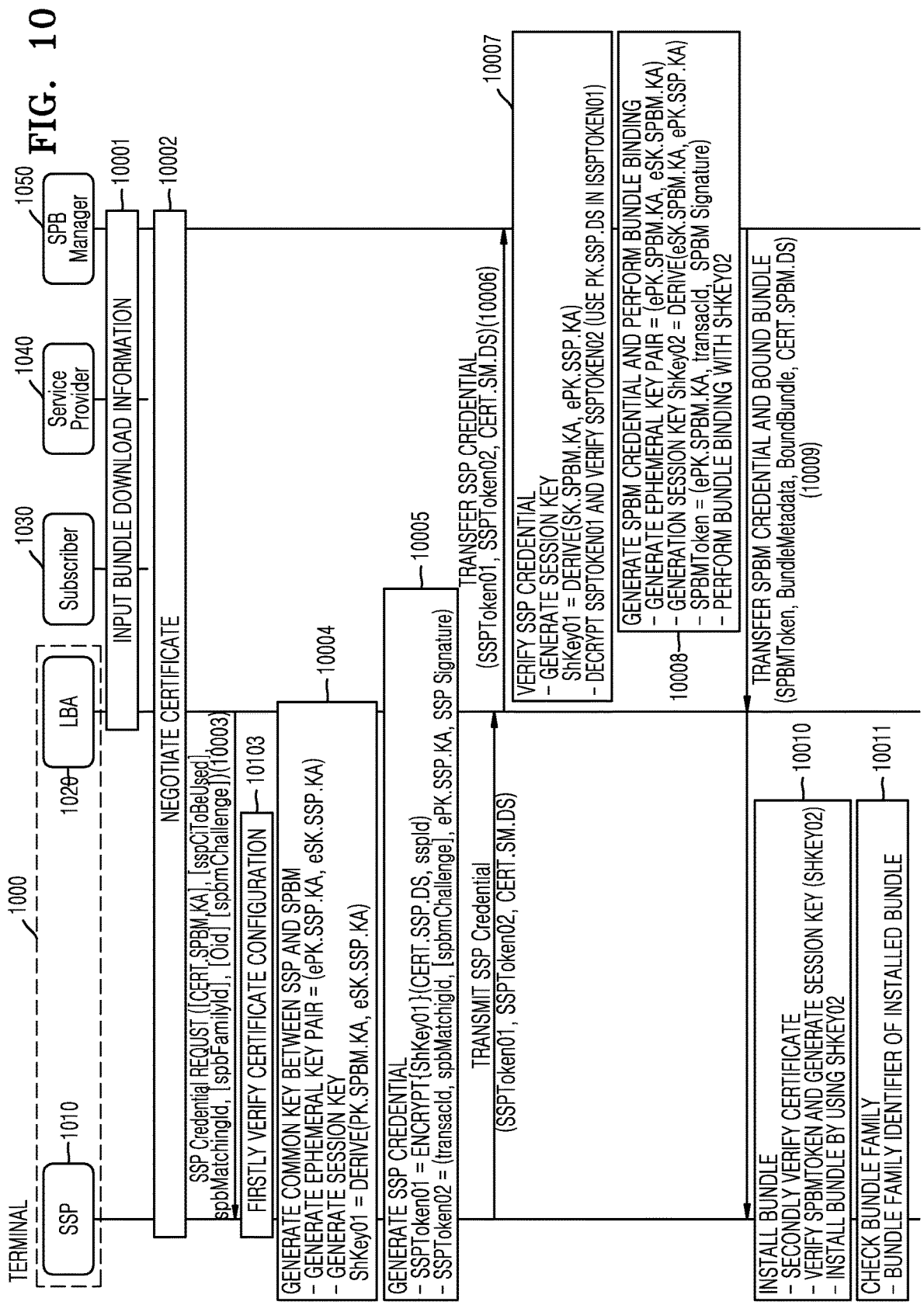
FIG. 10 is a diagram illustrating an example of a procedure in which a terminal downloads a bundle from a secondary platform bundle manager and installs the bundle, according to an embodiment of the disclosure.

FIG. 10 is a diagram illustrating an example of a procedure in which a terminal 1000 downloads a bundle from an SPBM 1050 and installs the bundle, according to an embodiment of the disclosure.

Referring to FIG. 10, at operation 10001, bundle download information may be transferred to an LBA 1020 of the terminal 1000. The bundle download information may be at least one of an SPBM Addr to which the LBA 1020 is to access, a bundle classifier of a prepared bundle, an SPB Family ID of the prepared bundle, or an SPB Family Custodian Object ID of the prepared bundle. The bundle classifier may include at least one of a bundle matching ID or a bundle event ID. In addition, the bundle classifier may include the SPB Family ID and SPB Family Custodian Object ID of the prepared bundle. The bundle event ID may include at least one of the bundle matching ID or the SPBM Addr. The bundle download information may be input (e.g., QR code scanning, direct text input, etc.) to the LBA 1020 by a subscriber 1030, or input to the LBA 1020 by using a push input through an information provision server (not shown). In addition, the LBA 1020 may access the information provision server (not shown) pre-configured in the terminal 1000 to receive the bundle download information.

At operation 10002, the terminal 1000 and the SPBM 1050 may perform a procedure of negotiating a certificate for selecting a certificate that may be used for mutual authentication and encryption therebetween. Operation 10002 may correspond to the operation of FIG. 7A.

At operation 10003, the LBA 1020 may request SSP authentication information (SSP Credential) from an SSP 1010. Here, the LBA 1020 may request the SSP Credential by including a bundle matching ID. In addition, the LBA 1020 may selectively transfer, to the SSP 1010, at least one of an spbFamilyId, an Oid, an SPBM certificate, an sspCiToBeUsed, or an spbmChallenge of a bundle to be additionally downloaded. Here, the SPBM certificate may be data including a certificate (CERT.SPBM.DS) for key agreement or a temporary public key for key agreement of the SPBM 1050, which may be used to generate a session key.

At operation 10103, the SSP 1010 may verify whether the bundle is supportable by comparing pieces of SpbmVerification that may be used by the SSP 1010 to verify the SPBM 1050, pieces of SpblVerification that may be used by the SPBM 1050 to verify the SSP 1010, and the SPBM certificate, sspCiToBeUsed, spbFamilyId, and Oid transferred from the LBA 1020 at operation 10003, for each configured SPB Family ID and each configured SPB Family Custodian Object ID.

At operation 10004, the SSP 1010 may generate a session key (ShKey01) with the SPBM 1050. The SSP 1010 may generate an SSP ephemeral public key, (ePK.SSP.KA) and an SSP ephemeral secret key (eSK.SSP.KA). In addition, the SSP 1010 may extract a public key (PK.SPBM.KA) for key agreement from the SPBM certificate transferred at operation 10001, 10002, or 10003, and may generate the ShKey01 through a key derivation function (KDF) by using the PK.SPBM.KA and the eSK.SSP.KA of the corresponding SPBM 1050. Here, the SSP 1010 may use a KDF defined in BSI TR 03111 as the KDF, and the ShKey01 may include 128 bits or 256 bits.

At operation 10005, the SSP 1010 may generate SSP Credential. At operation 10005, the SSP 1010 may generate an SSPToken01 by encrypting SSP certificate (CERT.SSP.DS) existing in a hierarchy of a certificate negotiated with the SPBM 1050 by using the ShKey01 generated at operation 10004. Here, the CERT.SSP.DS may be a certificate for digital signature. In addition, the SSP 1010 may generate the SSPToken01 by encrypting an SSP ID together with the CERT.SSP.DS.

Further, at operation 10005, the SSP 1010 may generate an SSPToken02 by including at least one of a transaction ID indicating a current session, a bundle matching ID, or an ePK.SSP.KA. Here, the SSP 1010 may generate the SSPToken02 by selectively including an spbmChallenge. In addition, the SSP 1010 may generate the SSPToken02 by including an SSP digital signature capable of verifying the integrity of information included in the SSPToken02 with the CERT.SSP.DS included in the SSPToken01. The SSPToken01 and the SSPToken02 may be transferred from the SSP 1010 to the LBA 1020. At operation 10005, the SSP 1010 may be connected to the transaction ID of the current session and store at least one of an SPB Family ID of the current session, an SPB Family Custodian Object ID, and used certificate information.

In addition, the SSP 1010 may inform the LBA 1020 that a result of at least one of operations 10003, 10004, or 10005 is generated due to the request of the LBA 1020 transferred at operation 10003. Further, the LBA 1020 may confirm that the result is generated at operation 10005, and may request the SSP 1010 to transfer information generated at operation 10005. At operation 10005, the SSP 1010 may transfer the SSP Credential to the LBA 1020.

At operation 10006, the terminal 1000 may transfer the SSP Credential to the SPBM 1050. In addition, at operation 10006, the LBA 1020 and the SPBM 1050 may perform a TLS connection. The TLS connection at operation 10006 may use a server authentication method in which the LBA 1020 checks the identity of the SPBM 1050, among TLS connection methods. At operation 10006, the terminal 1000 may transfer the SSPToken01 and the SSPToken02 to the SPBM 1050. In addition, the terminal 1000 may transfer the SSPToken01 and the SSPToken02 to the SPBM 1050 by including an SSP maker certificate (CERT.SM.DS) for verifying the validity of the SSP certificate included in the SSPToken01. When at least one sub CI certificate is needed to verify the validity of the CERT.SM.DS, at operation 10006, the terminal 1000 may submit at least one sub CI certificate together with the CERT.SM.DS.

At operation 10007, the SPBM 1050 may verify the SSP Credential. At operation 10007, the SPBM 1050 may generate a ShKey01 through a KDF by using an ePK.SSP.KA included in the SSPToken02 and a secret key (SK.SPB.KA) for key agreement paired with the PK.SPBM.KA of the SPBM 1050. Here, the SPBM 1050 may use a KDF defined in BSI TR 03111 as the KDF, and the ShKey01 may include 128 bits or 256 bits. At operation 10007, the SPBM 1050 may extract the CERT.SSP.DS by decoding the SSPToken01 by using the SPBM 1050. In addition, at operation 10007, the SPBM 1050 may verify the SSP certificate by using the CERT.SM.DS transferred from the LBA 1020. The SPBM 1050 may extract an SSP public key (PK.SSP.DS) from the CERT.SSP.DS, and may verify the SSP digital signature included in the SSPToken02.

At operation 10008, the SPBM 1050 may generate a session key to be used with the SSP 1010. The SPBM 1050 may generate an SPBM ephemeral public key (ePK.SPBM.KA) and an SPBM ephemeral secret key (eSK.SPBM.KA). In addition, the SPBM 1050 may generate a session key (ShKey02) through a KDF by using the ePK.SSP.KA and eSK.SPBM.KA verified at operation 10007. Here, the SPBM 1050 may use a KDF defined in BSI TR 03111 as the KDF, and the ShKey02 may include 128 bits or 256 bits.

At operation 10008, the SPBM 1050 may generate an SPBMToken. The SPBMToken generated by the SPBM 1050 may include at least one of the ePK.SPBM.KA or the transaction ID, and may include an SPBM digital signature that may verify the integrity of the information.

At operation 10008, the SPBM 1050 may generate a bound bundle by encrypting all or part of the bundle with the ShKey02, such that the bundle may be decrypted only by the SSP 1010.

At operation 10007 or 10008, the SPBM 1050 may generate bundle metadata (not shown). The bundle metadata may include at least one of an SPB Family ID or an SPB Family Custodian Object ID of the bundle. In addition, the bound bundle or the bundle may at least one of the SPB Family ID or the SPB Family Custodian Object ID of the bundle.

At operation 10009, the SPBM 1050 may transfer the SPBMToken and the bound bundle to the LBA 1020. Here, the SPBM 1050 may transfer the bundle metadata. Here, the SPBM 1050 may transfer the SPBMToken and the bound bundle to the LBA 1020 by including SPBM certificate (CERT.SPBM.DS) for verifying the SPBM digital signature included in the SPBMToken. When at least one sub CI certificate is needed to verify the validity of the CERT.SPBM.DS, at operation 10009, the SPBM 1050 may submit at least one sub CI certificate to the LBA 1020 together with the CERT.SPBM.DS. The LBA 1020 may transfer the information to the SSP 1010 to request verification and bundle installation.

At operation 10010, the SSP 1010 may verify the SPBMToken. At operation 10010, the SSP 1010 may verify the validity of the CERT.SPBM.DS and may verify the SPBM digital signature included in the SPBMToken by using an SPBM public key (PK.SPBM.DS) included in the corresponding certificate. In addition, the SSP 1010 may verify the validity of the SPBMToken by comparing whether a transaction ID generated by the SSP 1010 at operation 10005 is the same as the transaction ID included in the SPBMToken. Further, the SSP 1010 may generate the ShKey02 through a KDF by using the eSK.SSP.KA and the ePK.SPBM.KA included in the SPBMToken. Here, the SSP 1010 may use a KDF defined in BSI TR 03111 as the KDF, and the ShKey02 may include 128 bits or 256 bits. At operation 10009, the SSP 1010 may decrypt the bound bundle by using the ShKey02 and install the bundle in the SSP 1010. At operation 10010, when the bundle is installed, a bundle installation confirmation of an end user (not shown) may be additionally received according to a configuration value of at least one of the terminal 1000, the SSP 1010, or the LBA 1020. At operation 10010, the SSP 1010 may transfer a result of the bundle installation to the LBA 1020.

At operation 10011, the SSP 1010 may compare the SPB Family ID stored at operation 10003 with an SPB Family ID of the installed bundle, and when the two SPB Family IDs are the same, may transfer an installation completion result to the LBA 1020. When the two SPB Family IDs do not correspond to each other, the SSP 1010 may delete the installed bundle or configure the state of the installed bundle to unavailable and may transfer a result thereof to the LBA 1020.

Figure 11:
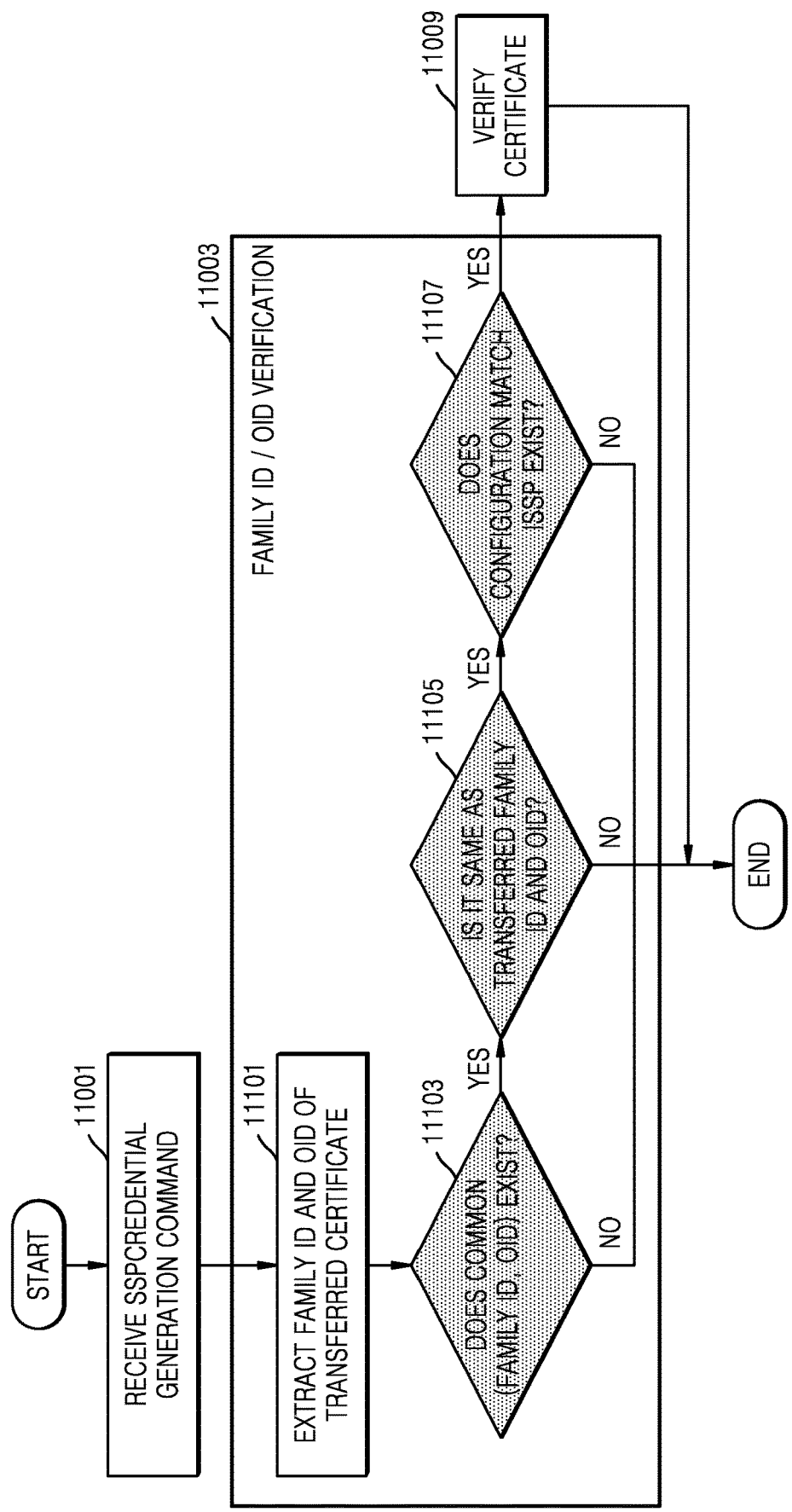
FIG. 11 is a diagram illustrating an example of a procedure in which a terminal obtains bundle download information from a secondary platform bundle manager, according to an embodiment of the disclosure.

FIG. 11 is a diagram illustrating an example of a procedure in which a terminal obtains bundle download information from a secondary platform bundle manager, according to an embodiment of the disclosure. FIG. 11 is a diagram illustrating an example of a procedure corresponding to operation 10103 of FIG. 10.

Referring to FIG. 11, at operation 11001, an SSP may receive an SSP Credential generation command from an LBA. At operation 11001, the SSP Credential generation command transferred from the LBA may include at least one of an SPB Family ID (spbFamilyId) and an SPB Family Custodian Object ID (Oid) of a bundle to be downloaded, an SPBM certificate, or certificate information (sspCiToBeUsed) to be used by the SSP. In addition, when at least one sub CI certificate is needed to determine whether the SPBM certificate is valid, the SSP Credential generation command transferred from the LBA may include at least one sub CI certificate together with the SPBM certificate.

Referring to FIG. 11, at operation 11003, the SSP may compare and verify the spbFamilyId and Oid transferred from the LBA, spbFamilyIds and Oids included in SPBM certificates, the SPBM certificates, and the sspCiToBeUsed, with certificate information stored in the SSP. At operation 11101, the SSP may extract spbFamilyId and Oid configuration values from the transferred SPBM certificates. That is, FID and Oid values may be extracted, and there may be a plurality of FID values and a plurality of Oid values. At operation 11103, the SSP determines whether a common value of the spbFamilyId and Oid configuration values extracted from each SPBM certificate exists. Here, there may be a plurality of common values. At operation 11103, when the common value does not exist, the SSP may generate a verification failure error and terminate a verification process by determining that the spbFamilyIds and Oids of the SPBM certificates transferred from the LBA are not valid.

Referring to FIG. 11, when the common value exists at operation 11103, at operation 11105, the SSP may determine whether the same value exists in spbFamilyId and Oid transferred at operation 11001 and the common value of the spbFamilyId and Oid configuration values determined at operation 11103. At operation 11105, when the same value does not exist, the SSP may generate a verification failure error and terminate a verification process by determining that the spbFamilyIds and Oids of the SPBM certificates transferred from the LBA are not valid.

Referring to FIG. 11, when the same value exists at operation 11105, at operation 11107, the SSP may check whether a certificate configuration assigned to the spbFamilyIds and Oids determined at operation 11105 exists. Further, when the spbFamilyId and Oid are not included in the SPBM certificates transferred from the LBA, the SSP may not carry out operations 11103 and 11105. In addition, at operation 11107, the SSP may check whether a certificate configuration assigned to the spbFamilyId and Oid transferred at operation 11101 exists. When the certificate configuration does not exist in the SSP, at operation 11009, the SSP may verify the SPBM certificate transferred at operation 11001 by using at least one of pieces of certificate information (SpbmVerification) that may be used to verify the SPBM with the certificate configuration. In addition, the SSP may determine whether a value of at least one of pieces of certificate information (SpblVerification) that may be used by the SPBM with the certificate configuration to verify the SSP corresponds to the sspCiToBeUsed transferred at operation 11001.

Referring to FIG. 11, at operation 11107, when the certificate configuration assigned to the corresponding spbFamilyId and the corresponding Oid does not exist in SSP, the SSP may check whether a certificate configuration assigned to the corresponding spbFamilyId exists. When the certificate configuration exists in the SSP, at operation 11009, the SSP may verify the SPBM certificate transferred at operation 11001 by using at least one of the pieces of SpbmVerification that may be used to verify the SPBM with the certificate configuration. In addition, the SSP may determine whether the value of at least one of pieces of SpblVerification that may be used by the SPBM with the certificate configuration to verify the SSP corresponds to the sspCiToBeUsed transferred at operation 11001.

Referring to FIG. 11, when the certificate configuration assigned to the corresponding spbFamilyId does not exist at operation 11107, the SSP may check whether a certificate configuration to which a spbFamilyId and an Oid are not assigned exists. When the certificate configuration exists in the SSP, at operation 11009, the SSP may verify the SPBM certificate transferred at operation 11001 by using at least one of the pieces of SpbmVerification that may be used to verify the SPBM with the certificate configuration. In addition, the SSP may determine whether the value of at least one of the pieces of SpblVerification that may be used by the SPBM with the certificate configuration to verify the SSP corresponds to the sspCiToBeUsed transferred at operation 11001.

Referring to FIG. 11, at operation 11009, when the verification of the certificate information to be used by the SSP or the SPBM certificates fails, the SSP may generate a verification failure error and terminate a verification process by determining that the SPBM certificate transferred from the LBA is not valid.

Figure 12:
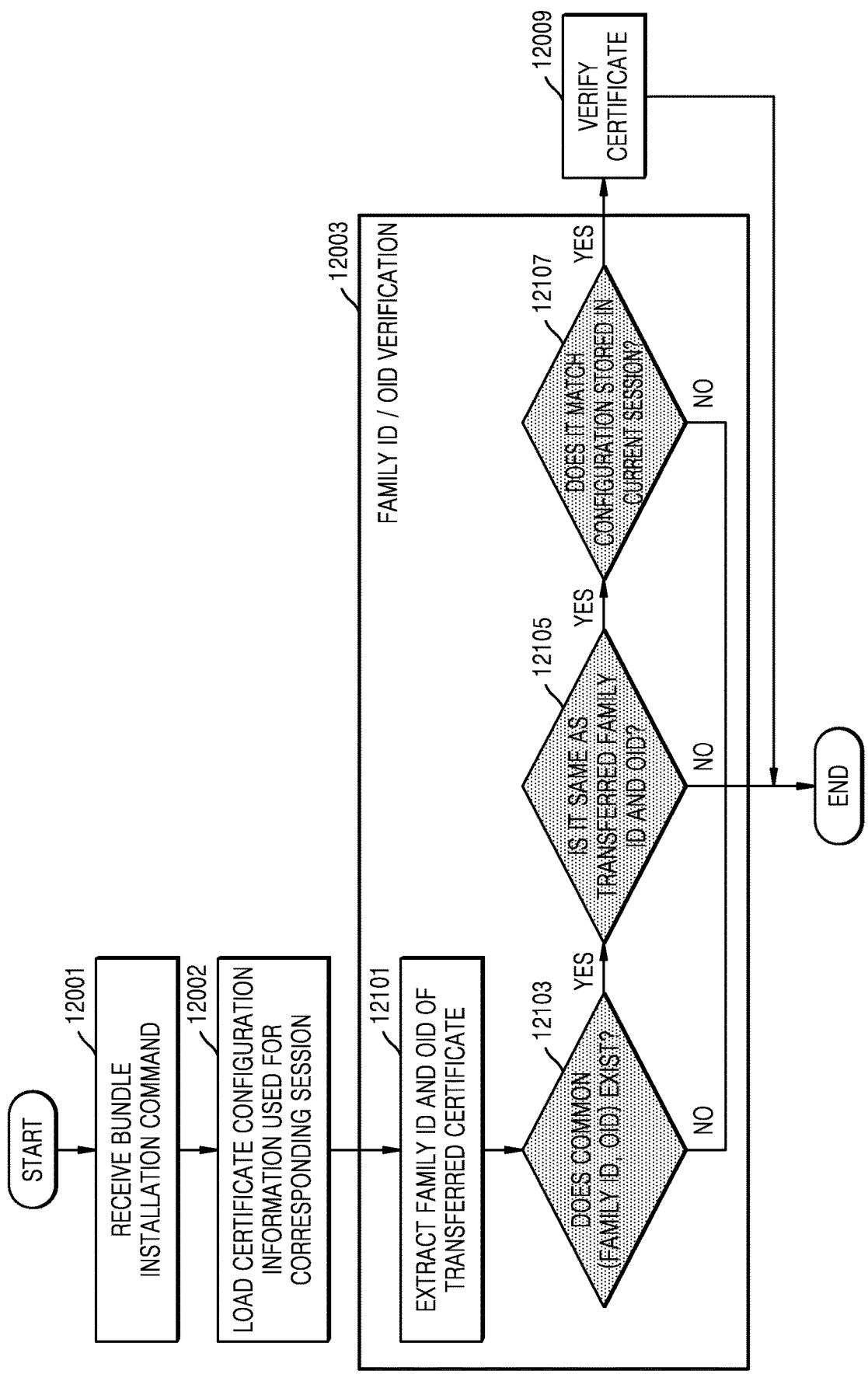
FIG. 12 is a diagram illustrating an example of a procedure in which a secondary platform bundle manager verifies a certificate used in a process of downloading a bundle, according to an embodiment of the disclosure.

FIG. 12 is a diagram illustrating an example of a procedure in which a secondary platform bundle manager verifies a certificate used in a process of downloading a bundle, according to an embodiment of the disclosure. FIG. 12 is a diagram illustrating an example of a procedure corresponding to operation 10010 of FIG. 10.

Referring to FIG. 12, at operation 12001, the SSP may receive a bundle installation command from an LBA. Here, the bundle installation command transferred from the LBA may include at least one of the SPBMToken, bound bundle, bundle metadata, or CERT.SPBM.DS shown at operation 10009 of FIG. 10. In addition, when at least one sub CI certificate is needed to verify whether the CERT.SPBM.DS is valid, the bundle installation command may include at least one sub CI certificate together with the CERT.SPBM.DS. Further, the CERT.SPBM.DS or the bound bundle may include an SPB Family ID, or the SPB Family ID and an SPB Family Custodian Object ID of a current bundle.

Referring to FIG. 12, at operation 12002, the SSP may retrieve information of at least one of an SPB Family ID, SPB Family Custodian Object ID, or certificate configuration stored in a current download session. The information may be stored in connection with a transaction ID indicating the current session. Alternatively, at operation 12002, the SSP may retrieve certificate configurations assigned to the SPB Family ID and SPB Family Custodian Object ID included in the bundle metadata or bound bundle transferred at operation 12001.

Referring to FIG. 12, at operation 12003, the SSP may verify the CERT.SPBM.DS transferred from the LBA and the at least one sub CI certificate together with the CERT.SPBM.DS. At operation 12101, the SSP may extract SPB Family ID and SPB Family Custodian Object ID configuration values from the transferred certificates. That is, the SSP may extract FID and Oid values, and there may be a plurality of FID values and a plurality of Oid values. At operation 12103, the SSP may determine whether a common value of SPB Family ID and SPB Family Custodian Object ID configuration values extracted from each SPBM certificate exists. Here, there may be a plurality of common values. When the common value does not exist at operation 12103, the SSP may generate a verification failure error and terminate a verification process by determining that the SPB Family ID and SPB Family Custodian Object ID configuration values of the SPBM certificates transferred from the LBA are not valid.

Referring to FIG. 12, when the common value exists at operation 12103, at operation 12105, the SSP may determine whether the same value exists in the SPB Family ID and SPB Family Custodian Object ID included in the bundle metadata or bound bundle transferred at operation 12001 and the common value of the SPB Family ID and SPB Family Custodian Object ID configuration values determined at operation 12103. At operation 12105, when the same value does not exist, the SSP may generate a verification failure error and terminate a verification process by determining that SPB Family ID and SPB Family Custodian Object ID of the SPBM certificates transferred from the LBA are not valid.

Referring to FIG. 12, when the same value exists at operation 12105, at operation 12107, the SSP may check whether the determined SPB Family ID and SPB Family Custodian Object ID correspond to the SPB Family ID and SPB Family Custodian Object ID stored in the current download session retrieved at operation 12002. Moreover, at operation 12101, when the SPB Family ID and the SPB Family Custodian Object ID are not included in the certificates transferred from the LBA, the SSP may not carry out operations 12103 and 12105. In addition, at operation 12107, the SSP may check whether the SPB Family ID and SPB Family Custodian Object ID included in the bundle metadata or bound bundle transferred at operation 12001 correspond to the SPB Family ID and SPB Family Custodian Object ID stored in the current download session retrieved at operation 12002.

At operation 12107, when the two values do not correspond to each other, the SSP may generate a verification failure error and terminate a verification process by determining that the SPB Family ID and SPB Family Custodian Object ID of the SPBM certificates transferred from the LBA are not valid.

Referring to FIG. 12, at operation 12107, the SSP may determine whether the SPB Family ID and SPB Family Custodian Object ID determined at operation 12105 correspond to the SPB Family ID and SPB Family Custodian Object ID stored in the current download session retrieved at operation 12002. In addition, at operation 12009, the SSP may verify the SPBM certificates transferred at operation 12001 by using certificate information (SpbmVerification) that may be used to verify the SPBM among the certificate configurations retrieved at operation 12002.

Referring to FIG. 12, at operation 12009, when the verification of the certificate information to be used by the SSP or the SPBM certificates fails, the SSP may generate a verification failure error and terminate a verification process by determining that the SPBM certificate transferred from the LBA is not valid.

Figure 13:
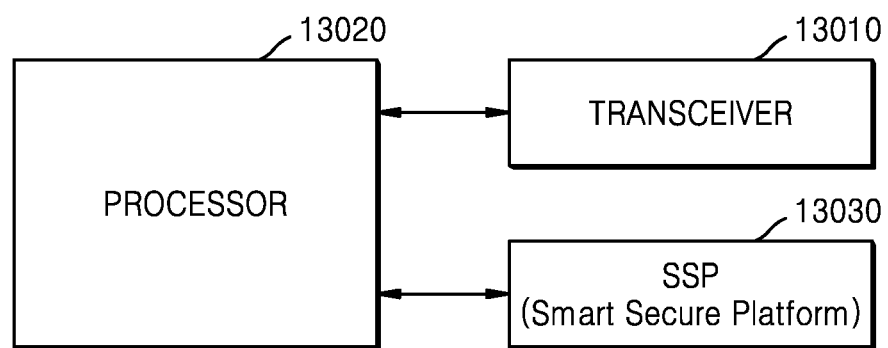
FIG. 13 is a diagram illustrating a configuration of a terminal according to an embodiment of the disclosure.

FIG. 13 is a diagram illustrating a configuration of a terminal according to an embodiment of the disclosure.

Referring to FIG. 13, the terminal may include a transceiver 13010 and at least one processor 13020. In addition, the terminal may include an SSP 13030. For example, the SSP 13030 may be inserted into the terminal or embedded in the terminal. The at least one processor 13020 may also be referred to as a controller.

However, the configuration of the terminal is not limited to FIG. 13 and may include more elements or fewer elements than those illustrated in FIG. 13. According to an embodiment of the disclosure, the transceiver 13020 and a memory (not shown) may be implemented in the form of a single chip. In addition, when the SSP 13030 is embedded, the transceiver 13020 may be implemented in the form of a single chip, including the SSP 13030. According to an embodiment of the disclosure, the transceiver 13010 may transmit and receive, to and from an SPBM, signals, information, data, etc. according to one or more embodiments of the disclosure. The transceiver 13010 may include a radio frequency (RF) transmitter up-converting and amplifying a frequency of a transmitted signal, an RF receiver amplifying a received signal with low noise and down-converting a frequency of the received signal, etc. However, this is merely an embodiment of the transceiver 13010, and the elements of the transceiver 13010 are not limited to the RF transmitter and the RF receiver. In addition, the transceiver 13010 may receive a signal through a wireless channel to output the signal to the at least one processor 13020, and transmit a signal output from the at least one processor 13020 through the wireless channel According to an embodiment of the disclosure, the transceiver 13010 may receive a certificate of the SPBM, CI information to be used by the SSP 13030, an SPB Family ID, a bound bundle, etc. from the SPBM. In addition, the transceiver 13010 may transmit, to the SPBM, CI information corresponding to a specific SPB Family ID, authentication information of the SSP 13030, etc.

The at least one processor 13020 is an element for overall control of the terminal. The at least one processor 13020 may control the overall operation of the terminal according to one or more embodiments of the disclosure as described above.

The SSP 13030 may include a processor or controller for installing and controlling a bundle, or may have applications installed therein.

According to an embodiment of the disclosure, of the disclosure, at least one processor or controller in the SSP 13030 may check CI information that may be used when downloading and installing a specific bundle corresponding to a specific SPB Family ID, and may verify at least one of an SPBM certificate, CI information to be used by the SSP 13030, or SPB Family ID transferred based on CI information for each SPB Family ID pre-configured in the SSP 13030.

In addition, according to an embodiment of the disclosure, the at least one processor 13020 may control the transceiver 13010 to transfer, to the SPBM, the CI information corresponding to the specific SPB Family ID and receive, from the SPBM, at least one of the SPBM certificate, the CI information to be used by the SSP 13030, or the SPB Family ID.

According to one or more embodiments of the disclosure, the SSP 13030 may download and install a bundle. In addition, the SSP 13030 may manage the bundle.

Further, according to an embodiment of the disclosure, the SSP 13030 may operate under the control of the at least one processor 13020. Alternatively, the SSP 13030 may include the processor or controller for installing and controlling a bundle, or may have the applications installed therein. Some or all of the applications may be installed in the SSP 13030 or the memory (not shown).

The terminal may further include the memory (not shown) and may store data such as a basic program, an application program, configuration information, etc. for operation of the terminal. In addition, the memory (not shown) may include at least one of a flash memory-type storage medium, a hard disk-type storage medium, a multimedia card micro-type storage medium, a card type memory (e.g., a secure digital (SD) or extreme digital (XD) memory, etc.), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). Further, the at least one processor 13020 may perform various operations by using various programs, content, data, etc. stored in the memory.

Figure 14:
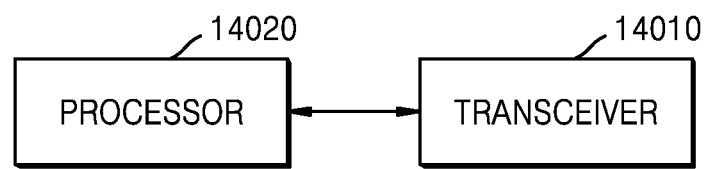
FIG. 14 is a diagram illustrating a configuration of a secondary platform bundle manager according to an embodiment of the disclosure.

FIG. 14 is a diagram illustrating a configuration of an SPBM according to an embodiment of the disclosure.

Referring to FIG. 14, the SPBM may include a transceiver 14010 and at least one processor 14020. However, the configuration of the SPBM is not limited to FIG. 14 and may include more elements or fewer elements than those illustrated in FIG. 14. According to an embodiment of the disclosure, the transceiver 14010, the at least one processor 14020, and a memory (not shown) may be implemented in the form of a single chip.

According to an embodiment of the disclosure, the transceiver 14010 may transmit and receive, to and from a terminal, a subscriber, or a service provider, signals, information, data, etc. according to one or more embodiments of the disclosure. For example, the transceiver 14010 may receive, from the terminal, a specific SPB Family ID or SPB Family Custodian Object ID, certificate information corresponding to the SPB Family Custodian Object ID, authentication information of an SSP, etc., and may transmit, to the terminal, an SPBM certificate, certificate information to be used by the SSP, an SPB Family ID, a bound bundle, etc.

The transceiver 14010 may include an RF transmitter up-converting and amplifying a frequency of a transmitted signal, an RF receiver amplifying a received signal with low noise and down-converting a frequency of the received signal, etc. However, this is merely an embodiment of the transceiver 14010, and the elements of the transceiver 14010 are not limited to the RF transmitter and the RF receiver. In addition, the transceiver 14010 may receive a signal through a wireless channel to output the signal to the at least one processor 14020, and transmit a signal output from the at least one processor 14020 through the wireless channel.

The at least one processor 14020 is an element for overall control of the SPBM. The at least one processor 14020 may control the overall operation of the SPBM according to one or more embodiments of the disclosure as described above. The at least one processor 14020 may be referred to as a controller.

According to an embodiment of the disclosure, the at least one processor 14020 may select an SPBM certificate to be transferred to the terminal and certificate information to be used by the SSP of the terminal, verify SSP Credential of the terminal, and generate an SPBMToken and a bound bundle.

In addition, according to an embodiment of the disclosure, the at least one processor 14020 may control the transceiver 14010 to transmit, to the terminal, the SPBM certificate, the certificate information to be used by the SSP, the SPB Family ID, the bound bundle, etc., and receive, from the terminal, certificate information corresponding to a specific SPB Family ID, authentication information of the SSP, etc.

The SPBM may further include the memory (not shown) and may store data such as a basic program, an application program, configuration information, etc. for operation of the SPBM. In addition, the memory (not shown) may include at least one of a flash memory-type storage medium, a hard disk-type storage medium, a multimedia card micro-type storage medium, a card type memory (e.g., an SD or XD memory, etc.), a magnetic memory, a magnetic disk, an optical disk, a RAM, a SRAM, a ROM, a programmable read-only memory (PROM), or an EEPROM. Further, the at least one processor 14020 may perform various operations by using various programs, content, data, etc. stored in the memory.

In the above particular embodiments of the disclosure, the elements included in the disclosure are expressed in the singular or plural according to the presented particular embodiments of the disclosure. However, the singular or plural expressions are selected suitably according to the presented situations for convenience of description, the disclosure is not limited to the singular or plural elements, and the elements expressed in the plural may even be configured in the singular or the elements expressed in the singular may even be configured in the plural.

It should be understood that one or more embodiments of the disclosure and terms used therefor are not intended to limit the technology described in the disclosure to a specific embodiment, but include various modifications, equivalents, and/or replacements of the corresponding embodiment. In connection with the description of the drawings, like reference numerals may be used for like elements. In the disclosure, the expression "A or B", "at least one of A and/or B", "A, B or C" or "at least one of A, B and/or C", etc., may include all possible combinations of items listed together. The expression such as "first" or "second" may modify corresponding elements regardless of order or importance, and are used only to distinguish one element from another, but are not limited thereto. When it is stated that any (e.g., a first) element is "(functionally or communicatively)" connected to another (e.g., a second) element, any of the elements may be directly connected to the other element, or may be connected via another (e.g., a third) element.

The term "module" used in the disclosure includes a unit configured of hardware, software, or firmware, and may be used interchangeably with terms such as logic, logic block, part, or circuit. The module may be an integrated part, or a minimum unit or a portion thereof performing one or more functions. For example, the module may be configured with an application-specific integrated circuit (ASIC).

The one or more embodiments of the disclosure may be implemented by software (e.g., a program) including instructions stored in machine (e.g., a computer)-readable storage media (e.g., an internal memory or external memory). The machine may include a terminal according to one or more embodiments as a device capable of calling a stored instruction from a storage medium and operating according to the called instruction. When the instruction is executed by a processor (e.g., the processor 820 of FIG. 8 or the processor 920 of FIG. 9), the processor may perform a function corresponding to the instruction directly or by using other elements under the control of the processor. The instruction may include code generated or executed by a compiler or interpreter.

The machine-readable storage media may be provided in the form of non-transitory storage media. Here, the term "non-transitory" means that the storage media do not include a signal and are tangible, but does not distinguish between data being stored semi-permanently or temporarily in the storage media.

The method according to one or more embodiments disclosed herein may be included and provided in a computer program product. The computer program product may be traded as a product between a seller and a purchaser. The computer program product may be distributed online in the form of a machine-readable storage medium (e.g., a compact disc read-only memory (CD-ROM)), or through an application store (e.g., Play Store™). In the case of online distribution, at least a portion of the computer program product may be temporarily stored in a storage medium such as a server of a manufacturer, a server of an application store, or a memory of a relay server, or may be temporarily generated.

According to the one or more embodiments of the disclosure, the terminal may manage and verify a certificate.

Each of the elements (e.g., modules or programs) according to the one or more embodiments of the disclosure may be configured as a single or a plurality of entities, and some of the sub-elements described above may be omitted or other sub-elements may be further included in the one or more embodiments. Alternatively or additionally, some elements (e.g., modules or programs) may be integrated into one entity to perform functions, performed by each of the corresponding elements before being integrated, in the same or similar manner According to the one or more embodiments of the disclosure, operations performed by modules, programs, or other elements may be performed sequentially, parallelly, repetitively, or heuristically, at least some of the operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a smart secure platform (SSP) in a terminal verifying certificate in a wireless communication system, the method comprising:
receiving, from a local bundle assistant (LBA), an SSP credential request including a secondary platform bundle manager (SPBM) credential, wherein the SPBM credential includes secondary platform bundle family identifier (SPB Family ID), secondary platform bundle family custodian object identifier (SPB Family Custodian Object ID) and a first SPBM certificate for key agreement, and wherein the first SPBM certificate for the key agreement includes a public key for key agreement of an SPBM;
verifying the first SPBM certificate based on the SPB Family ID and the SPB Family Custodian Object ID;
generating an ephemeral key pair of a SSP ephemeral public key and a SSP ephemeral secret key;
generating a first session key based on the SSP secret public key and the public key for key agreement of the SPBM;
generating the SSP credential based on the first session key; and
transmitting the generated SSP credential to the LBA, in response to receiving a transfer request from the LBA,
wherein the SPB Family ID represents an identifier that identifies a type of a bundle, and
wherein the SPB Family Custodian Object ID represents an identifier that identifies a subject which manages the SPB Family ID.

2. The method of claim 1, further comprising:
receiving, from the LBA, a second SPBM certificate for digital signature and an SPBM ephemeral public key;
verifying the second SPBM certificate for digital signature based on the SPB Family ID and the SPB Family Custodian Object ID;
generating a second session key based on the SPBM ephemeral public key and the SSP ephemeral secret key; and
installing a bundle based on the second session key.

3. The method of claim 1, further comprising:
determining the first SPBM certificate for key agreement as invalid, when the verification of the first SPBM certificate fails.

4. The method of claim 1, wherein the SPB Family ID and the SPB Family Custodian Object ID are included in an extension configuration of the first SPBM certificate.

5. The method of claim 2, further comprising:
determining the second SPBM certificate for digital signature as invalid, when the verification of the second SPBM certificate fails.

6. The method of claim 2, wherein the SPB Family ID and the SPB Family Custodian Object ID are included in an extension configuration of the second SPBM certificate.

7. The method of claim 1, further comprising:
receiving, from the LBA, a certificate information request configured in the SSP, including the SPB Family ID and the SPB Family Custodian Object ID;
generating SSP certificate information based on the SPB Family ID or the SPB Family Custodian Object ID; and
transmitting, to the LBA, the generated SSP certificate information.

8. The method of claim 7, wherein the SSP certificate information comprises general certificate information, bundle family certificate information, bundle family custodian certificate information, first certificate information on the SSP to verify the SPBM, and second certificate information on the SPBM to verify the SSP.

9. A smart secure platform (SSP) in a terminal verifying certificate in a wireless communication system, the SSP comprising:
a transceiver; and
at least one processor coupled with the transceiver, the at least one processor configured to:
receive, from a local bundle assistant (LBA), an SSP credential request including a secondary platform bundle manager (SPBM) credential, wherein the SPBM credential includes secondary platform bundle family identifier (SPB Family ID), secondary platform bundle family custodian object identifier (SPB Family Custodian Object ID) and a first SPBM certificate for key agreement, and wherein the first SPBM certificate for the key agreement includes a public key for key agreement of an SPBM,
verify the first SPBM certificate based on the SPB Family ID and the SPB Family Custodian Object ID,
generate an ephemeral key pair of an SSP ephemeral public key and an SSP ephemeral secret key;
generate a first session key based on the SSP secret public key and the public key for key agreement of the SPBM;
generate the SSP credential based on the first session key, and
transmit the generated SSP credential to the LBA, in response to receiving
a transfer request from the LBA,
wherein the SPB Family ID represents an identifier that identifies a type of a bundle, and
wherein the SPB Family Custodian Object ID represents an identifier that identifies a subject which manages the SPB Family ID.

10. The SSP of claim 9, wherein the at least one processor is further configured to:
receive, from the LBA, a second SPBM certificate for digital signature and an SPBM ephemeral public key,
verify the second SPBM certificate for digital signature based on the SPB Family ID and the SPB Family Custodian Object ID,
generate a second session key based on the SPBM ephemeral public key and the SSP ephemeral secret key, and
install a bundle based on the second session key.

11. The SSP of claim 9, further comprising:
determining the first SPBM certificate for key agreement as invalid, when the verification of the first SPBM certificate fails.

12. The SSP of claim 9, wherein the SPB Family ID and the SPB Family Custodian Object ID are included in an extension configuration of the first SPBM certificate.

13. The SSP of claim 10, wherein the at least one processor is further configured to:
determine the second SPBM certificate for digital signature as invalid, when the verification of the second SPBM certificate fails.

14. The SSP of claim 10, wherein the SPB Family ID and the SPB Family Custodian Object ID are included in an extension configuration of the SPBM certificate.

15. The SSP of claim 9, wherein the at least one processor is further configured to:
receive, from the LBA, a certificate information request configured in the SSP including the SPB Family ID and the SPB Family Custodian Object ID, generate SSP certificate information based on the SPB Family ID or the SPB Family Custodian Object ID, and transmit, to the LBA, the generated SSP certificate information.

16. The SSP of claim 15, wherein the SSP certificate information comprises general certificate information, bundle family certificate information, bundle family custodian certificate information, first certificate information on the SSP to verify the SPBM and second certificate information on the SPBM to verify the SSP.

* * * * *